(12) United States Patent
Nakada et al.

(10) Patent No.: US 10,436,092 B2
(45) Date of Patent: Oct. 8, 2019

(54) EXHAUST PURIFICATION SYSTEM AND CONTROL METHOD THEREFOR

(71) Applicant: ISUZU MOTORS LIMITED, Tokyo (JP)

(72) Inventors: Teruo Nakada, Yokohama (JP); Takayuki Sakamoto, Fujisawa (JP); Daiji Nagaoka, Kamakura (JP); Hiroyuki Yuza, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 102 days.

(21) Appl. No.: 15/552,200

(22) PCT Filed: Feb. 12, 2016

(86) PCT No.: PCT/JP2016/054189
§ 371 (c)(1),
(2) Date: Aug. 18, 2017

(87) PCT Pub. No.: WO2016/133025
PCT Pub. Date: Aug. 25, 2016

(65) Prior Publication Data
US 2018/0038254 A1 Feb. 8, 2018

(30) Foreign Application Priority Data
Feb. 20, 2015 (JP) .................. 2015-032281

(51) Int. Cl.
*F01N 3/20* (2006.01)
*F02D 45/00* (2006.01)
(Continued)

(52) U.S. Cl.
CPC ............ *F01N 3/2006* (2013.01); *F01N 9/00* (2013.01); *F02D 9/02* (2013.01); *F02D 9/06* (2013.01);
(Continued)

(58) Field of Classification Search
CPC ...... F01N 3/2006; F01N 9/00; F01N 13/0097; F01N 2240/36; F01N 2260/04;
(Continued)

(56) References Cited

U.S. PATENT DOCUMENTS 7,316,107 B2 * 1/2008 Aratsuka ............... F01N 3/0235
60/295
8,001,774 B2 * 8/2011 Onodera ............... F01N 3/0235
60/295
(Continued)

FOREIGN PATENT DOCUMENTS

JP 2001227325 A * 8/2001
JP 2002161793 A 6/2002
(Continued)

OTHER PUBLICATIONS

Notification of Reasons for Refusal for related JP App No. 2015-032281 dated Sep. 11, 2018, 9 pgs.
(Continued)

*Primary Examiner* — Laert Dounis
*Assistant Examiner* — Matthew T Largi
(74) *Attorney, Agent, or Firm* — Procopio, Cory, Hargreaves & Savitch LLP

(57) ABSTRACT

An exhaust purification system includes an exhaust aftertreatment apparatus which is provided on an exhaust passage of an internal combustion engine and which includes catalysts for purifying exhaust gas, a catalyst temperature retention control module for executing a catalyst temperature retention control in which an intake air flow is reduced to thereby suppress a reduction in the temperature of the catalysts when the internal combustion engine is in a motoring state where fuel injection into the internal combustion engine is stopped, and a prohibition module for prohibiting the execution of the catalyst temperature retention control in
(Continued)

a case where an activation of an exhaust brake system is detected while the internal combustion engine is in the motoring state.

4 Claims, 11 Drawing Sheets

(51) Int. Cl.
  F02D 9/02 (2006.01)
  F02D 9/06 (2006.01)
  F01N 9/00 (2006.01)
  F02D 41/02 (2006.01)
  F01N 3/08 (2006.01)
  F01N 3/10 (2006.01)
  F01N 3/022 (2006.01)
  F01N 3/023 (2006.01)
  F01N 3/025 (2006.01)
  F01N 13/00 (2010.01)

(52) U.S. Cl.
  CPC ......... F02D 41/0235 (2013.01); F02D 45/00 (2013.01); F01N 3/0222 (2013.01); F01N 3/0235 (2013.01); F01N 3/0253 (2013.01); F01N 3/0807 (2013.01); F01N 3/0842 (2013.01); F01N 3/103 (2013.01); F01N 3/106 (2013.01); F01N 13/0097 (2014.06); F01N 2240/36 (2013.01); F01N 2260/04 (2013.01); F01N 2550/02 (2013.01); F01N 2560/06 (2013.01); F01N 2560/07 (2013.01); F01N 2610/03 (2013.01); F01N 2900/0416 (2013.01); F01N 2900/08 (2013.01); F01N 2900/1602 (2013.01); F01N 2900/1614 (2013.01); Y02T 10/47 (2013.01)

(58) Field of Classification Search
  CPC ............. F01N 2550/02; F01N 2560/06; F01N 2560/07; F01N 2610/03; F01N 2900/0416; F01N 2900/08; F01N 2900/1602; F01N 2900/1614; F01N 3/0222; F01N 3/0235; F01N 3/0253; F01N 3/0807; F01N 3/0842; F01N 3/103; F01N 3/106; F02D 41/0235; F02D 45/00; F02D 9/02; F02D 9/06
  See application file for complete search history.

(56) References Cited

U.S. PATENT DOCUMENTS

| 2004/0050036 | A1* | 3/2004 | Ueda ..................... F01N 11/00 60/285 |
| 2004/0094120 | A1* | 5/2004 | Kishibata ............. F02D 41/123 123/325 |
| 2005/0217252 | A1 | 10/2005 | Sato et al. |
| 2010/0024401 | A1 | 2/2010 | Ichikawa |
| 2010/0199640 | A1* | 8/2010 | Kodo ................. F02D 41/0245 60/278 |
| 2010/0275582 | A1* | 11/2010 | Wada .................. B01D 53/944 60/276 |
| 2014/0033923 | A1* | 2/2014 | Yabe ................. B01D 46/0063 95/278 |

FOREIGN PATENT DOCUMENTS

| JP | 2005-282545 A | | 10/2005 |
| JP | 2010031731 A | | 2/2010 |
| JP | 2010-116844 A | | 5/2010 |
| JP | 2010116844 A | * | 5/2010 |
| JP | 2010-265786 A | | 11/2010 |
| JP | 2011179425 A | | 9/2011 |

OTHER PUBLICATIONS

International Search Report and Written Opinion for PCT App No. PCT/JP2016/054189 dated Apr. 26, 2016, 6 pgs.
Notification of Reasons for Refusal for related JP App No. 2015-032281 dated Dec. 18, 2018, 6 pgs.

* cited by examiner

EXHAUST PURIFICATION SYSTEM AND CONTROL METHOD THEREFOR

CROSS-REFERENCE TO RELATED APPLICATIONS

This application is a U.S. National Stage entry of PCT Application No. PCT/JP2016/054189, filed on Feb. 12, 2016, which claims priority to Japanese Patent Application No. 2015-032281, filed Feb. 20, 2015, the contents of which are incorporated herein by reference.

TECHNICAL FIELD

The present invention relates to an exhaust purification system and a method therefor.

BACKGROUND ART

Conventionally, there is known, as an exhaust purification system for an internal combustion engine, an exhaust purification system including a NOx catalyst for reducing and purifying nitrogen oxides (hereinafter, referred to as NOx) in exhaust gas and an oxidation catalyst. NOx catalysts and oxidation catalysts cannot exhibit sufficiently their purification performances unless their catalyst temperatures reach or exceed their activation temperatures. Due to this, in a situation where the temperature of exhaust gas lowers as when a vehicle is being decelerated, a so-called catalyst temperature retention control is preferably executed in which the temperature of a catalyst is retained by suppressing effectively the flow of exhaust gas of a low temperature into the catalyst by reducing an intake air flow (an exhaust gas flow) (for example, refer to Patent Literatures 1, 2).

PRIOR ART LITERATURES

Patent Literatures

Patent Literature 1: JP-A-2010-116844
Patent Literature 2: JP-A-2005-282545

SUMMARY OF THE INVENTION

Incidentally, in vehicle deceleration, in a case where the catalyst temperature retention control is executed in which the intake air flow is reduced when the vehicle runs in such a state that an engine revolves with fuel injection stopped (a motoring state), for example, where an exhaust brake needs to be activated to operate, there is caused a problem that a sufficient braking force cannot be secured due to a reduction in exhaust gas flow.

An exhaust purification system and a control method therefor of the present disclosure are provided with a view to securing effectively an exhaust braking force by controlling appropriately the execution of a catalyst temperature retention control in which an intake air flow is reduced according to whether or not an exhaust brake system is in operation when an internal combustion engine is operating in a motoring state.

According to the present disclosure, there is provided an exhaust purification system which includes an exhaust after-treatment apparatus which is provided on an exhaust passage of an internal combustion engine and which includes a catalyst for purifying exhaust gas discharged from the internal combustion engine, and a controller configured to execute executing a catalyst temperature retention control in which an intake air flow is reduced to thereby suppress a reduction in temperature of the catalyst when the internal combustion engine is in a motoring state where fuel injection into the internal combustion engine is stopped, and prohibiting an execution of the catalyst temperature retention control in a case where an activation of an exhaust brake system which is connected to the internal combustion engine is detected while the internal combustion engine is in the motoring state.

According to the present disclosure, there is provided an exhaust purification system including an exhaust after-treatment apparatus which is provided on an exhaust passage of an internal combustion engine and which comprises a catalyst for purifying exhaust gas discharged from the internal combustion engine, and a controller for detecting an operating state of the internal combustion engine and controlling an air-fuel ratio of the exhaust gas discharged from the internal combustion engine, wherein the controller operates to execute the following processes: a catalyst temperature retention process of executing a catalyst temperature retention control in which an intake air flow of the internal combustion engine is reduced to suppress a reduction in the temperature of the catalyst when the internal combustion engine is in a motoring state where fuel injection is stopped; and a prohibition process of prohibiting an execution of the catalyst temperature retention process in a case where an activation of an exhaust brake which is connected to the internal combustion engine is detected while the internal combustion engine is in the motoring state.

A control method for an exhaust purification system of the present disclosure includes an exhaust after-treatment apparatus which is provided on an exhaust passage of an internal combustion engine and which comprises a catalyst for purifying exhaust gas discharged from the internal combustion engine, and a controller for detecting an operating state of the internal combustion engine and controlling an air-fuel ratio of the exhaust gas discharged from the internal combustion engine, comprising:
a catalyst temperature retention process of executing a catalyst temperature retention control in which an intake air flow of the internal combustion engine is reduced to suppress a reduction in the temperature of the catalyst when the internal combustion engine is in a motoring state where fuel injection is stopped; and a prohibition process of prohibiting an execution of the catalyst temperature retention process in a case where an activation of an exhaust brake which is connected to the internal combustion engine is detected while the internal combustion engine is in the motoring state.

According to the exhaust purification system and the control method therefor according to the present disclosure, it is possible to secure effectively the exhaust braking force by controlling appropriately the execution of the catalyst temperature retention control in which the intake air flow is reduced according to whether or not the exhaust brake system is in operation when the internal combustion engine is operating in the motoring state.

DESCRIPTION OF ILLUSTRATIVE EMBODIMENTS

Hereinafter, an exhaust purification system according to an embodiment of the present disclosure will be described based on the accompanying drawings.

Figure 1:
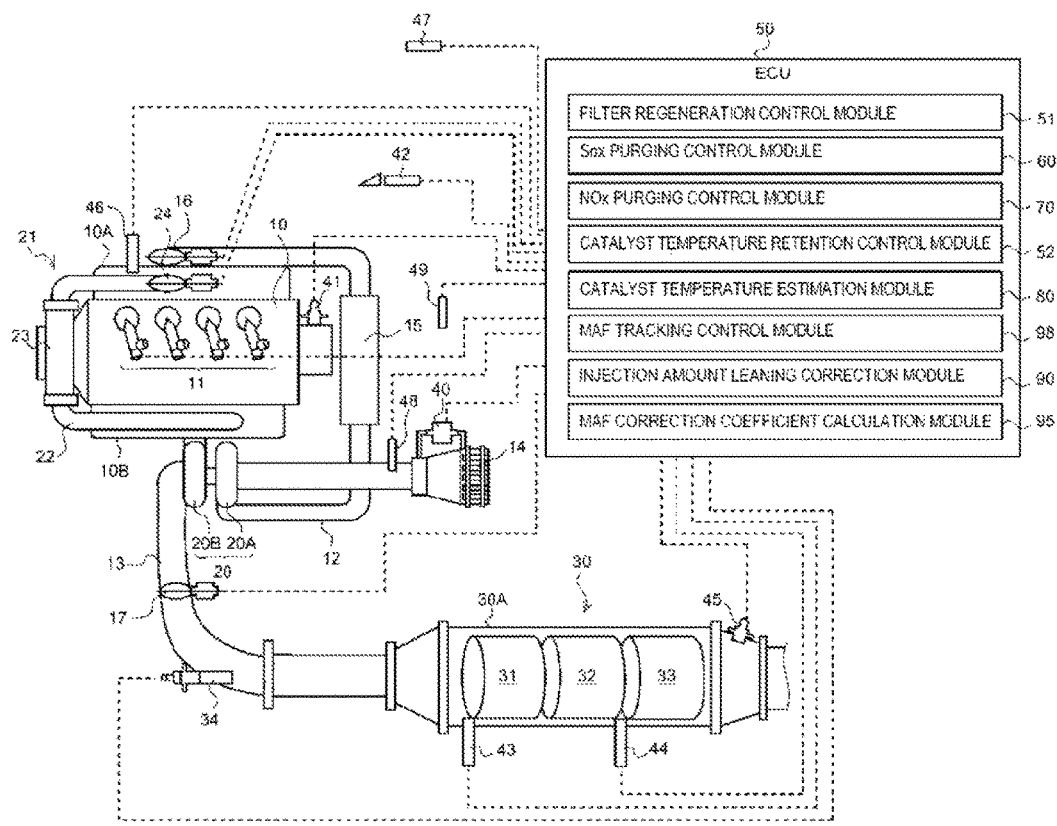
FIG. 1 is a schematic diagram showing an overall configuration of an exhaust purification system according to a present embodiment.

As shown in FIG. 1, direct injection injectors 11 are provided individually on cylinders of a diesel engine (hereinafter, referred to simply as an engine) 10 to inject highly pressurized fuel which is accumulated under pressure in a common rail, not shown, directly into the cylinders. A fuel injection amount and a fuel injection timing for each of the direct injection injectors 11 are controlled according to an instruction signal inputted from an electronic controller (hereinafter, referred to as an ECU) 50.

An intake passage 12 through which fresh air is introduced is connected to an intake manifold 10A of the engine 10, and an exhaust passage 13 through which exhaust gas is discharged to an exterior portion is connected to an exhaust manifold 10B. An air cleaner 14, an intake air flow sensor (hereinafter, referred to as MAF sensor) 40, an intake air temperature sensor 48, a compressor 20A of a variable capacity supercharger 20, an inter-cooler 15, an intake throttle valve 16 and the like are provided along the intake passage 12 sequentially in that order from an upstream side of an intake air flow. A turbine 20B of the variable capacity supercharger 20, an exhaust brake valve 17 which makes up part of an exhaust brake system, an exhaust gas after-treatment apparatus 30 and the like are provided along the exhaust passage 13 sequentially in that order from an upstream side of an exhaust gas flow. An engine revolution speed sensor 41, an accelerator pedal angle sensor 42, a boost pressure sensor 46, an outside air temperature sensor 47 and a vehicle speed sensor 49 are attached to the engine 10.

In the description of this embodiment, the MAF sensor 40 for measuring and detecting a mass air flow is used as an intake air flow sensor for measuring and detecting an intake air flow (a suction air flow) of the engine. However, an air flow sensor of a different type from the MAF sensor 40 or a device which replaces the air flow sensor may be used, provided that an engine suction air flow can be detected by those devices.

An EGR (Exhaust Gas Recirculation) device 21 includes an EGR passageway 22 which connects the exhaust manifold 10B and the intake manifold 10A, an EGR cooler 23 for cooling EGR gas and an EGR valve 24 for controlling an EGR amount.

The exhaust gas after-treatment apparatus 30 includes in a case 30A an oxidation catalyst 31, a NOx storage reduction catalyst 32, and a particulate filter (hereinafter, referred to simply as a filter) 33 which are arranged sequentially in that order from an upstream end of the case 30A. In addition, an exhaust injector 34 for injecting unburned fuel (mainly hydrocarbons (HC)) into the exhaust passage 13 according to an instruction signal inputted from the ECU 50 is provided on a portion of the exhaust passage 13 which is situated upstream of the oxidation catalyst 31.

The oxidation catalyst 31 is formed of a ceramic carrier of a honeycomb structure which carries an oxidation catalyst component on a surface thereof. When supplied with unburned fuel through a post injection by the exhaust injector 34 or the direct injection injectors 11, the oxidation catalyst 31 oxidizes the supplied unburned fuel to increase the temperature of exhaust gas.

The NOx storage reduction catalyst 32 is formed of a ceramic carrier of a honeycomb structure which carries an alkaline metal on a surface thereof. This NOx storage reduction catalyst 32 occludes NOx in exhaust gas when an air-fuel ratio of the exhaust gas is in a lean state, and when the air-fuel ratio of the exhaust gas is in a rich state, the NOx storage reduction catalyst 32 reduces the occluded NOx with a reducing agent (HC) contained in the exhaust gas for purification.

The filter 33 is formed, for example, by disposing a number of cells which are defined by porous bulkheads along a flowing direction of exhaust gas and sealing up upstream ends and downstream ends of the cells in an alternate fashion. The filter 33 collects PMs (particulate matters) in exhaust gas in fine holes and on surfaces of the bulkheads and executes a so-called forced filter regeneration in which the collected PMs are burned to be removed when an estimated amount of accumulation of collected PMs or an estimated PM accumulation amount reaches a predetermined amount. The forced filter regeneration is executed by supplying unburned fuel to the oxidation catalyst 31, which is disposed at an upstream end portion of the exhaust gas after-treatment apparatus 30, through an exhaust pipe injection or a post injection and raising the temperature of exhaust gas flowing into the filter 33 up to a PM combustion temperature.

A first exhaust gas temperature sensor 43 is provided upstream of the oxidation catalyst 31 and detects a temperature of exhaust gas that flows into the oxidation catalyst 31. A second exhaust gas temperature sensor 44 is provided between the oxidation catalyst 31 and the NOx storage reduction catalyst 32 and detects a temperature of exhaust gas that flows into the NOx storage reduction catalyst 32. A NOx/lambda sensor 45 is provided downstream of the filter 33 and detects a NOx value and a lambda value (hereinafter, referred also to as an air exceeding ratio) of exhaust gas which passes through the NOx storage reduction catalyst 32.

The ECU 50 performs various controls of the engine 10 and the like and is made up of a known CPU, ROM, RAM, input port and output port. To enable the ECU 50 to perform the various controls, sensor values are inputted into the ECU 50 from the sensors 40 to 48. The ECU 50 has a filter regeneration control module 51, a SOx purging control module 60, a NOx purging control module 70, a catalyst temperature retention control module 52, a catalyst temperature estimation module 80, a MAF tracking control module 98, an injection amount learning correction module 90, and a MAF correction coefficient calculation module 95 as part of its functional elements. These functional elements are described as being incorporated in the ECU 50, which is integrated hardware. However, some of the functional elements can also be provided on separate hardware.

[Filter Regeneration Control]

The filter regeneration control module 51 estimates a PM accumulation amount in the filter 33 from a mileage of the vehicle or a differential pressure between a front and rear of the filter or a filter front-rear differential pressure that is detected by a differential pressure sensor, not shown, and sets on a forced regeneration flag $F_{DPF}$ (refer to a time t1 in FIG. 2) when the estimated PM accumulation amount exceeds an upper limit threshold. When the forced regeneration flag $F_{DPF}$ is set on, an instruction signal is sent to the exhaust injector 34 which instructs the exhaust injector 34 to execute an exhaust pipe injection or an instruction signal is sent to the direct injection injectors 11 which instructs the direct injection injectors 11 to execute a post injection is sent, so that the temperature of exhaust gas is raised to the PM combustion temperature (for example, about 550° C.). This forced regeneration flag $F_{DPF}$ is set off (refer to a time t2 in FIG. 2) when the estimated PM accumulation amount is lowered to a predetermined lower limit threshold (a determination threshold) which indicates that the accumulated PM are burned and removed. The determination threshold that sets off the forced regeneration flag $F_{DPF}$ may be based on an upper limit elapsing time or an upper limit accumulated injection amount from a start of a forced filer regeneration ($F_{DPF}$=1).

In this embodiment, a fuel injection amount when a forced filter regeneration is performed is designed to be feedback controlled based on either an oxidation catalyst temperature or a NOx catalyst temperature that is selected as required by a reference temperature selection module 89 (refer to FIG. 10), which will be described in detail later.

[SOx Purging Control]

The SOx purging control module 60 is an example of a catalyst regenerator of the present disclosure and executes a control (hereinafter, this control will be referred to as a SOx purging control) to recover the NOx storage reduction catalyst 32 from the SOx poisoning by enriching exhaust gas to raise the temperature of the exhaust gas to a sulfur desorption temperature (for example, about 600° C.).

Figure 2:
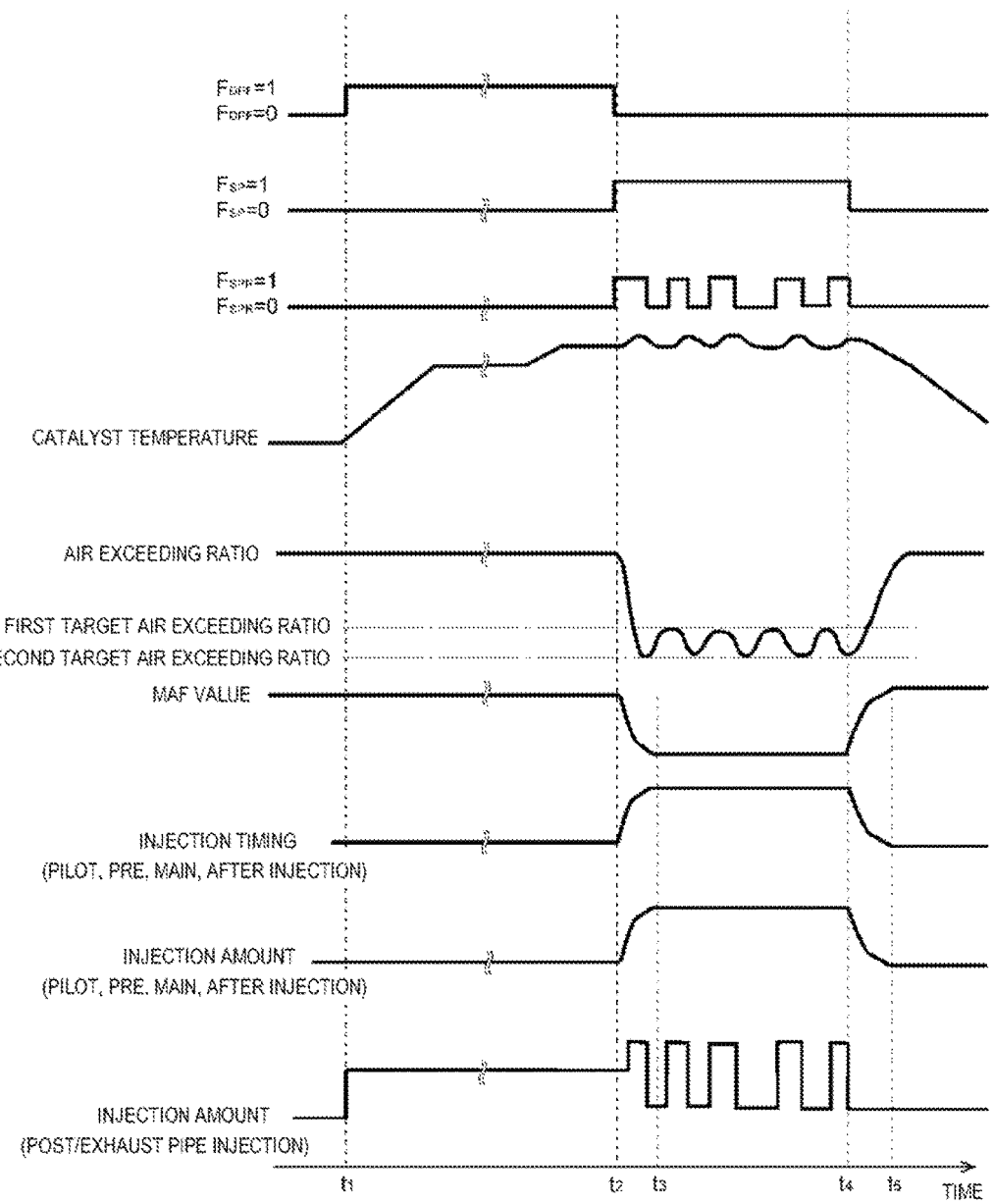
FIG. 2 is a timing chart illustrating a SOx purging control according to the embodiment.

FIG. 2 shows a timing chart of a SOx purging control according to the embodiment. As shown in FIG. 2, a SOx purging flag $F_{SP}$ that starts a SOx purging control is on at the same time that the forced regeneration flag $F_{DPF}$ is off (refer to the time t2 in FIG. 2). By doing so, the state where the temperature of the exhaust gas is raised by regenerating the filter 33 in a forced fashion can efficiently be shifted to the SOx purging control, thereby making it possible to reduce effectively an amount of consumption of fuel.

In this embodiment, the enrichment of exhaust gas by executing the SOx purging control is realized by executing both a SOx purging lean control in which the air exceeding ratio is lowered from an air exceeding ratio for a steady state running (about 1.5) to a first target air exceeding ratio (for example, about 1.3) which is leaner than an air exceeding ratio (about 1.0) corresponding to a stoichiometric air-fuel ratio by controlling the air intake system and a SOx purging rich control in which the air exceeding ratio is lowered from the first target air exceeding ratio to a second target air exceeding ratio (for example, about 0.9) which is richer than the first target air exceeding ratio by controlling the injection system. Hereinafter, the SOx purging lean control and the SOx purging rich control will be described in detail.

[Air Intake System Control for SOx Purging Lean Control]

Figure 3:
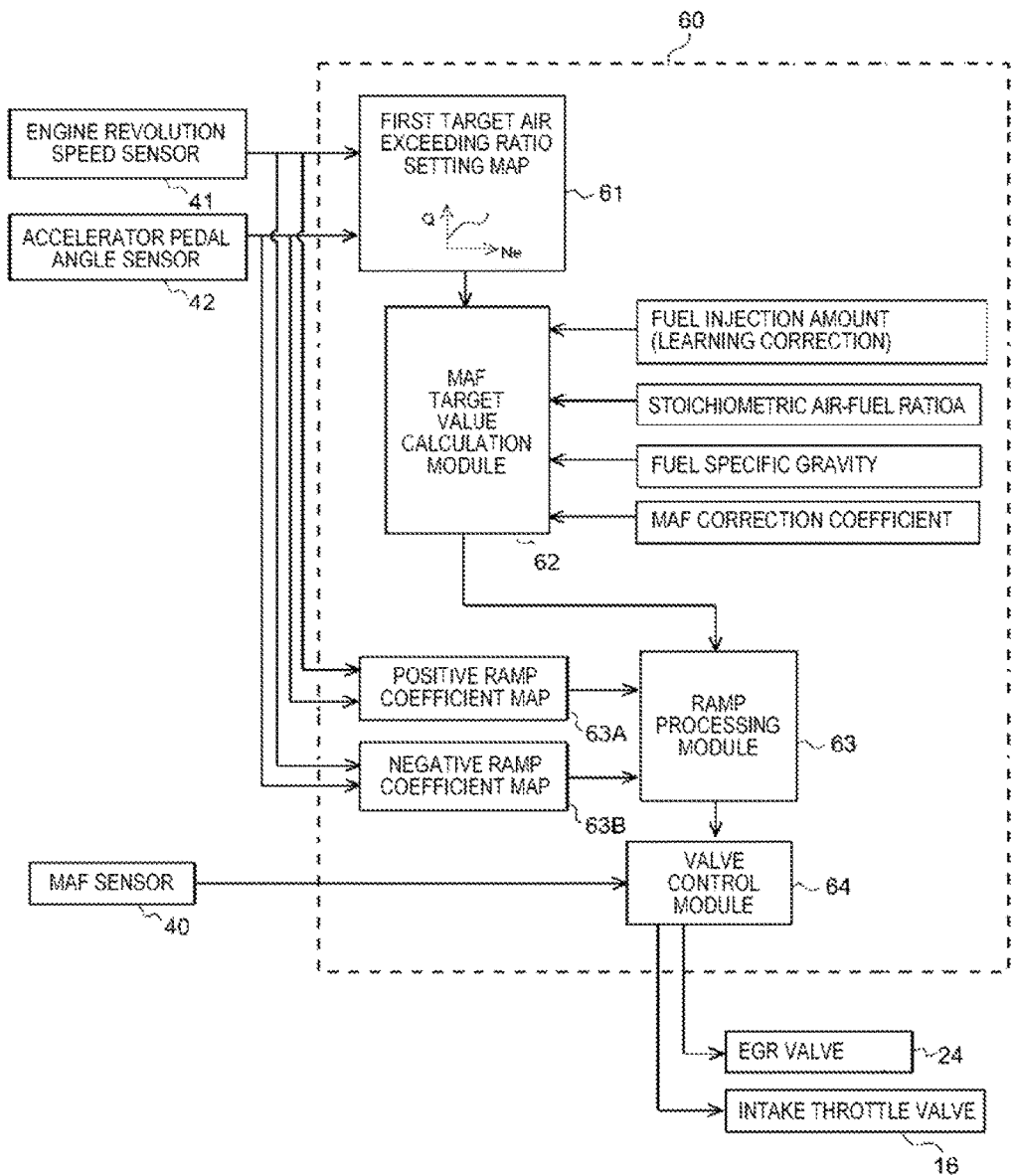
FIG. 3 is a block diagram illustrating a MAF target value setting process in executing a SOx purging lean control according to the embodiment.

FIG. 3 is a block diagram illustrating a MAF target value $MAF_{SPL\_Trgt}$ setting process in executing the SOx purging lean control. A first target air exceeding ratio setting map 61 is a map that is referred to based on an engine revolution speed Ne and an accelerator pedal angle Q (an amount of injection of fuel in the engine 10), and air exceeding ratio target values $\lambda_{SPL\_Trgt}$ (the first target air exceeding ratio) corresponding to engine revolution speeds Ne and accelerator pedal angles Q for the SOx purging lean control are set based on experiments in advance in the map 61.

Firstly, an air exceeding ratio target value $\lambda_{SPL\_Trgt}$ for the SOx purging lean control is read from the first target air exceeding ratio setting map 61 based on an engine revolution speed Ne and an accelerator pedal angle Q as input signals and is then inputted into a MAF target value calculation module 62. Further, in the MAF target value calculation module 62, a MAF target value $MAF_{SPL\_Trgt}$ for the SOx purging control is calculated based on the following expression (1).

$$MAF_{SPL\_Trgt} = \lambda_{SPL\_Trgt} \times Q_{fnl\_corrd} \times Ro_{Fuel} \times AFR_{sto} / Maf_{corr} \quad (1)$$

In the expression (1), Qfnl_corrd denotes a fuel injection amount (excluding an amount of fuel injected through post injection) on which a learning correction, which will be described later, has been performed, RoFuel denotes a fuel specific gravity, AFRsto denotes the stoichiometric air-fuel ratio, and Maf_corr denotes a MAF correction coefficient, which will be described later.

The MAF target value $MAF_{SPL\_Trgt}$ that is calculated by the MAF target value calculation module 62 is inputted into a ramp processing module 63 when the SOx purging flag $F_{SP}$ is on (refer to the time t2 in FIG. 2). The ramp processing module 63 reads a ramp coefficient from a positive ramp coefficient map 63A and a negative ramp coefficient map 63B based on input signals of an engine revolution speed Ne and an accelerator pedal angle Q and inputs a MAF target ramp value $MAF_{SPL\_Trgt\_Ramp}$ to which the ramp coefficient so read is added into a valve control module 64.

The valve control module 64 executes a feedback control in which the intake throttle valve 16 is controlled to be closed while the EGR valve 24 is controlled to be opened so that an actual MAF value $MAF_{ACT}$ inputted from the MAF sensor 40 becomes the MAF target ramp value $MAF_{SPL\_Trgt\_Ramp}$.

In this way, in this embodiment, the MAF target value $MAF_{SPL\_Trgt}$ is set based on the air exceeding ratio target value $\lambda_{SPL\_Trgt}$ that is read from the first target air exceeding ratio setting map 61 and the fuel injection amounts of the direct injection injectors 11, and the operation of the air intake system is feedback controlled based on the MAF target value $MAF_{SPL\_Trgt}$. By doing so, the exhaust gas can be reduced effectively to a desired air exceeding ratio that is necessary for the SOx purging lean control without providing a lambda sensor upstream of the NOx storage reduction catalyst 32 or without using a sensor value of the lambda sensor even when the lambda sensor is provided upstream of the NOx storage reduction catalyst 32.

Additionally, the MAF target value $MAF_{SPL\_Trgt}$ can be set through a feedforward control by using the fuel injection amount $Q_{fnl\_corrd}$ on which a learning correction has been performed as the fuel injection amounts of the direct injection injectors 11, thereby making it possible to eliminate effectively the influence resulting from the deterioration with age or property variation of the direct injection injectors 11 or the individual difference thereof.

In addition, the deterioration in drivability that would be caused by a misfire or torque variation of the engine 10 resulting from a dramatic change in the amount of intake air or the intake air flow can be prevented effectively by adding a ramp factor that is set according to the running state of the engine 10 to the MAF target value $MAF_{SPL\_Trgt}$.

[Fuel Injection Amount Setting for SOx Purging Rich Control]

Figure 4:
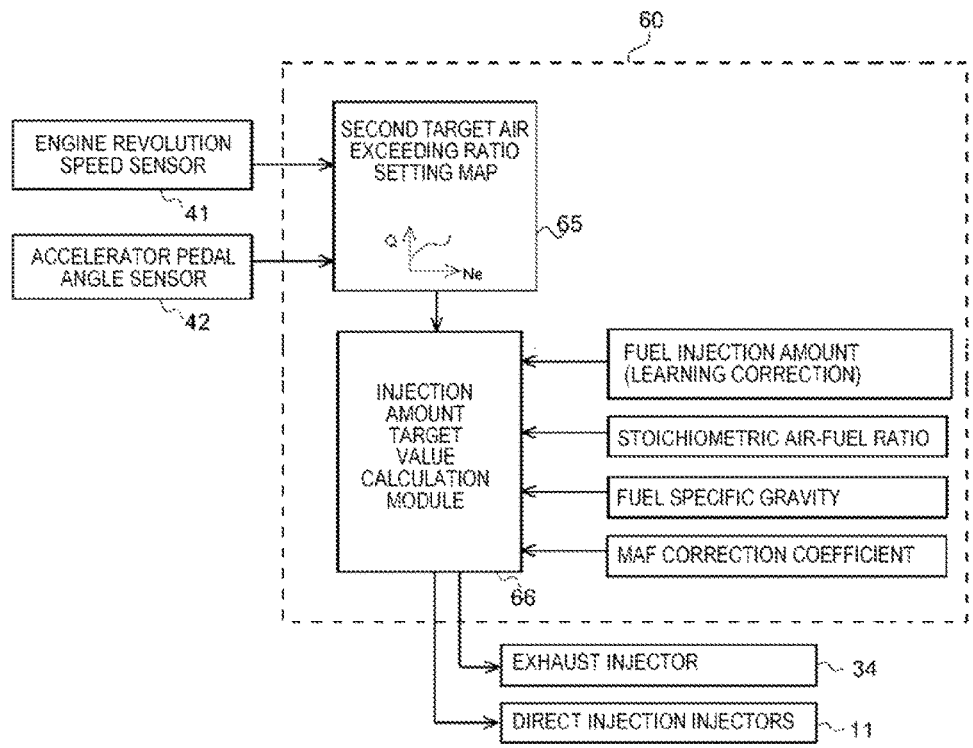
FIG. 4 is a block diagram illustrating a target injection amount setting process in executing a SOx purging rich control according to the embodiment.

FIG. 4 is a block diagram showing a setting process of a target injection amount $Q_{SPR\_Trgt}$ (an injection amount per unit time) for an exhaust pipe injection or a post injection in the SOx purging rich control. A second target air exceeding ratio setting map 65 is a map that is referred to based on an engine revolution speed Ne and an accelerator pedal angle Q, and air exceeding ratio target values $\lambda_{SPR\_Trgt}$ (second target air exceeding ratios) corresponding to engine revolution speeds Ne and accelerator pedal angles Q for a SOx purging rich control are set based on experiments in advance in the map.

Firstly, an exceeding air ratio target value $\lambda_{SPR\_Trgt}$ for the SOx purging rich control is read from the second target air exceeding ratio setting map 65 based on an engine revolution speed Ne and an accelerator pedal angle Q which are inputted as input signals and is then inputted into an injection amount target value calculation module 66. Further, in the injection amount target value calculation module 66, a target injection value $Q_{SPR\_Trgt}$ for the SOx purging rich control is calculated based on the following expression (2).

$$QSPR\_Trgt = MAFSPL\_Trgt \times Maf\_corrd/(\lambda SPR\_Trgt \times RoFuel \times AFRsto) - Qfnl\_corrd \quad (2)$$

In the expression (2), $MAF_{SPL\_Trgt}$ denotes a MAF value for the SOx purging lean control, which is inputted from the MAF target value calculation module 62. In addition, Qfnl_corrd denotes a fuel injection amount (excluding an amount of fuel injected through post injection) on which a learning correction, which will be described later, has been performed and to which a MAF tracking control has not yet been applied, RoFuel denotes a fuel specific gravity, AFRsto denotes a stoichiometric air-fuel ratio, and Maf_corr denotes a MAF correction coefficient, which will be described later.

The target injection amount $Q_{SPR\_Trgt}$ calculated by the injection amount target value calculation module 66 is transmitted to the exhaust injector 34 or the direction injection injectors 11 as an injection instruction signal when a SOx purging rich flag $F_{SPR}$ is on.

In this way, in this embodiment, the target injection amount $Q_{SPR\_Trgt}$ is set based on the air exceeding ratio target value $\lambda_{SPR\_Trgt}$ that is read from the second target air exceeding ratio setting map 65 and the fuel injection amounts of the direct injection injectors 11. By doing so, the exhaust gas can be reduced effectively to a desired air exceeding ratio that is necessary for the SOx purging rich control without providing a lambda sensor upstream of the NOx storage reduction catalyst 32 or without using a sensor value of the lambda sensor even when the lambda sensor is provided upstream of the NOx storage reduction catalyst 32.

Additionally, the target injection amount $Q_{SPR\_Trgt}$ can be set through a feedforward control by using the fuel injection amount $Q_{fnl\_corrd}$ on which a learning correction has been performed as the fuel injection amounts of the direct injection injectors 11, thereby making it possible to eliminate effectively the influence resulting from the deterioration with age or property variation of the direct injection injectors 11.

[Catalyst Temperature Adjusting Control for SOx Purging Control]

The temperature of exhaust gas that flows into the NOx storage reduction catalyst 32 (hereinafter, referred also to as a catalyst temperature) during the SOx purging control is controlled by switching a SOx purging rich flag $F_{SPR}$ that executes the exhaust pipe injection or the post injection between on and off (rich and lean) alternately, as shown at times t2 to t4 in FIG. 2. When the SOx purging rich flag $F_{SPR}$ is set on ($F_{SPR}=1$), the catalyst temperature is raised by the exhaust pipe injection or the post injection (hereinafter, this period will be referred to as an injection period $T_{F\_INJ}$). On the other hand, when the SOx purging rich flag $F_{SPR}$ is set off, the exhaust pipe injection or the post injection is stopped, whereby the catalyst temperature is lowered (hereinafter, this period will be referred to as an interval $T_{F\_INT}$).

In this embodiment, the injection period $T_{F\_INJ}$ is set by reading a value corresponding to an engine revolution speed Ne and an accelerator pedal angle Q from an injection period setting map (not shown) that is prepared in advance through experiments. Injection periods obtained in advance through experiments that are necessary to lower the air exceeding ratio of exhaust gas to the second target air exceeding ratio are set so as to correspond to operating states of the engine 10 in the injection period setting map.

The interval $T_{F\_INT}$ is set through a feedback control when the SOx purging rich flag $F_{SPR}$ is switched from on to off where the catalyst temperature becomes the highest. Specifically, the interval $T_{F\_INT}$ is set through a PID control that is made up of a proportional control in which an input signal is changed in proportion to a deviation $\Delta T$ between a target catalyst temperature and an estimated catalyst temperature when the SOx purging rich flag $F_{SPR}$ is off, an integral control in which an input signal is changed in proportion to a time integral value of the deviation $\Delta T$ and a differential control in which an input signal is changed in proportion to a time differential value of the deviation $\Delta T$. The target catalyst temperature is set at the SOx desorption temperature at which SOx can be desorbed from the NOx storage reduction catalyst 32, and the estimated catalyst temperature is set at either the oxidation catalyst temperature or the NOx catalyst temperature that is selected by the reference temperature selection module 89 (refer to FIG. 10), which will be described in detail later.

Figure 5:
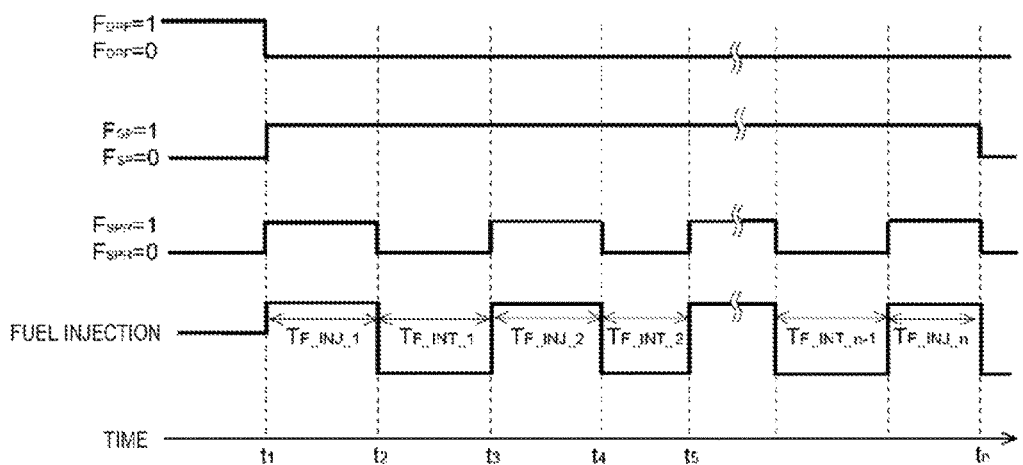
FIG. 5 is a timing chart illustrating a catalyst temperature adjusting control in the SOx purging control according to the embodiment.

As shown at a time t1 in FIG. 5, when the SOx purge flag $F_{SP}$ is on as a result of the end of the forced filter regeneration ($F_{DPF}=0$), the SOx purging rich flag $F_{SPR}$ is also on, and further, the interval $T_{F\_INT}$ that was feedback calculated during the previous SOx purging control is also reset temporarily. Namely, in an initial period immediately after the forced filter regeneration, the exhaust pipe injection or the post injection is executed according to an injection period $T_{F\_INJ\_1}$ (refer to a time period from a time t1 to a time t2 in FIG. 5) which is set in the injection period setting map. In this way, since the SOx purging control is started from the SOx purging rich control without performing the SOx purging lean control, it is possible to shift quickly to the SOx purging control without the exhaust gas temperature that is raised during the forced filter regeneration being lowered, thereby making it possible to reduce the amount of consumption of fuel.

Next, when the SOx purging rich flag $F_{SPR}$ is off after the injection period $T_{F\_INJ\_1}$ has elapsed, the SOx purging rich flag $F_{SPR}$ is kept off until the interval $T_{F\_INT\_1}$ that is set through the PID control elapses (refer to a time period from the time t2 to a time t3 in FIG. 5). Further, when the SOx purging rich flag $F_{SPR}$ is on after the interval $T_{F\_INT\_1}$ has elapsed, an exhaust pipe injection or a post injection corresponding to an injection period $T_{F\_INJ\_2}$ is executed again (refer to a time period from the time t3 to a time t4 in FIG. 5). Thereafter, the switching of the SOx purging rich flag $F_{SPR}$ between on and off is executed repeatedly until the SOx purging flag $F_{SP}$ is off as a result of a determination being made that the SOx purging control ends (refer to a time to in FIG. 5).

In this way, in this embodiment, the injection period $T_{F\_INJ}$ during which the catalyst temperature is raised and the air exceeding ratio is lowered to the second target air exceeding ratio is set from the map that is referred to based on the operating state of the engine 10, and the interval $T_{F\_INT}$ during which the catalyst temperature is lowered is processed through the PID control. By doing so, the air exceeding ratio can be lowered to the target air exceeding ratio in an ensured fashion while holding effectively the catalyst temperature during the SOx purging control within the desired temperature range that is necessary for purging.

[Determination on End of SOx Purging Control]

The SOx purging control ends by setting off the SOx purging flag $F_{SP}$ when any one of the following conditions is met: (1) injection amounts in the exhaust pipe injection or the post injection are accumulated since a time when the SOx purging flag $F_{SP}$ is set on and the accumulated injection amounts reach an upper threshold amount; (2) an elapsing time that has been counted since the start of the SOx purging control reaches an upper threshold time; and (3) a SOx adsorption amount of the NOx storage reduction catalyst 32 that is calculated based on a model expression that includes as input values the operating state of the engine 10 and the sensor value of the NOx/lambda sensor 45 is lowered to a predetermined threshold that indicates that SOx is removed successfully (refer to the time t4 in FIG. 2 and the time to in FIG. 5).

In this way, in this embodiment, it is possible to prevent effectively the fuel consumption amount from becoming excessive in the event that the SOx purging does not progress as expected due to a reduction in exhaust gas temperature by providing the upper limits to the accumulated injection amount and the elapsing time as the conditions under which the SOx purging control ends.

[NOx Purge Control]

The NOx purging controller 70 is an example of a catalyst regenerator of the present disclosure and executes a control in which the NOx occlusion capacity of the NOx storage reduction catalyst 32 is recovered by enriching exhaust gas to make NOx occluded in the NOx storage reduction catalyst 32 harmless through reduction and purification for emission to the atmosphere (hereinafter, this control will be referred to as a NOx purging control).

Figure 6:
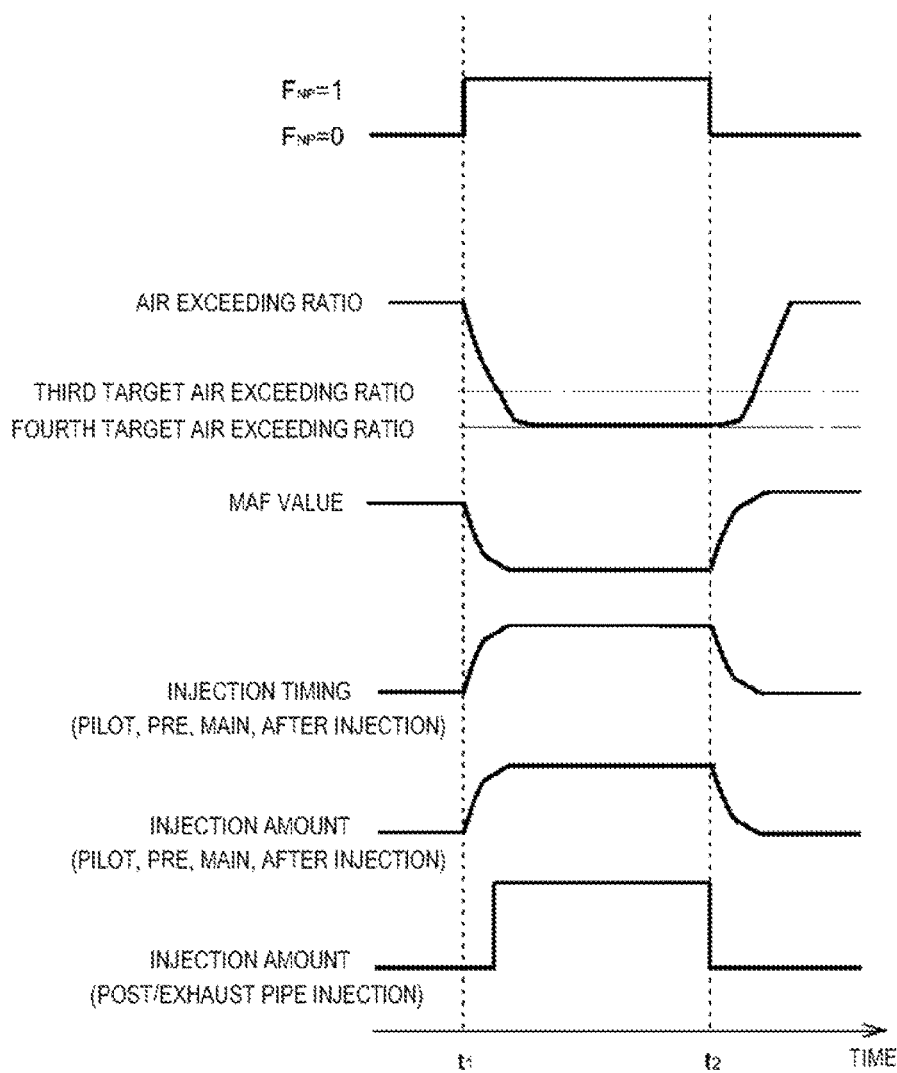
FIG. 6 is a timing chart illustrating a NOx purging control according to the embodiment.

A NOx purging flag $F_{NP}$ that starts the NOx purging control is set on when a NOx discharge amount per unit time is estimated from the operating state of the engine 10 and an estimated accumulation value ΣNOx resulting from accumulation of the estimated NOx discharge amount exceeds a predetermined threshold (refer to a time t1 in FIG. 6). Alternatively, the NOx purging flag FNP is set on when a NOx purification ratio by the NOx storage reduction catalyst 32 is calculated from a NOx discharge amount on an upstream side of the catalyst that is estimated from the operating state of the engine 10 and a NOx amount on a downstream side of the NOx storage reduction catalyst 32 that is detected by the NOx/lambder sensor 45 and this NOx purification ratio becomes lower than a predetermined determination threshold.

In this embodiment, the enrichment of exhaust gas by executing the NOx purging control is realized by executing both a NOx purging lean control in which the air exceeding ratio is lowered from an air exceeding ratio for a steady state running (about 1.5) to a third target air exceeding ratio (for example, about 1.3) which is leaner than an air exceeding ratio (about 1.0) corresponding to a stoichiometric air-fuel ratio by controlling the air intake system and a NOx purging rich control in which the air exceeding ratio is lowered from the third target air exceeding ratio to a fourth target air exceeding ratio (for example, about 0.9) which is richer than the third target air exceeding ratio by controlling the injection system. Hereinafter, the NOx purging lean control and the NOx purging rich control will be described in detail.

[MAF Target Value Setting for NOx Purging Lean Control]

Figure 7:
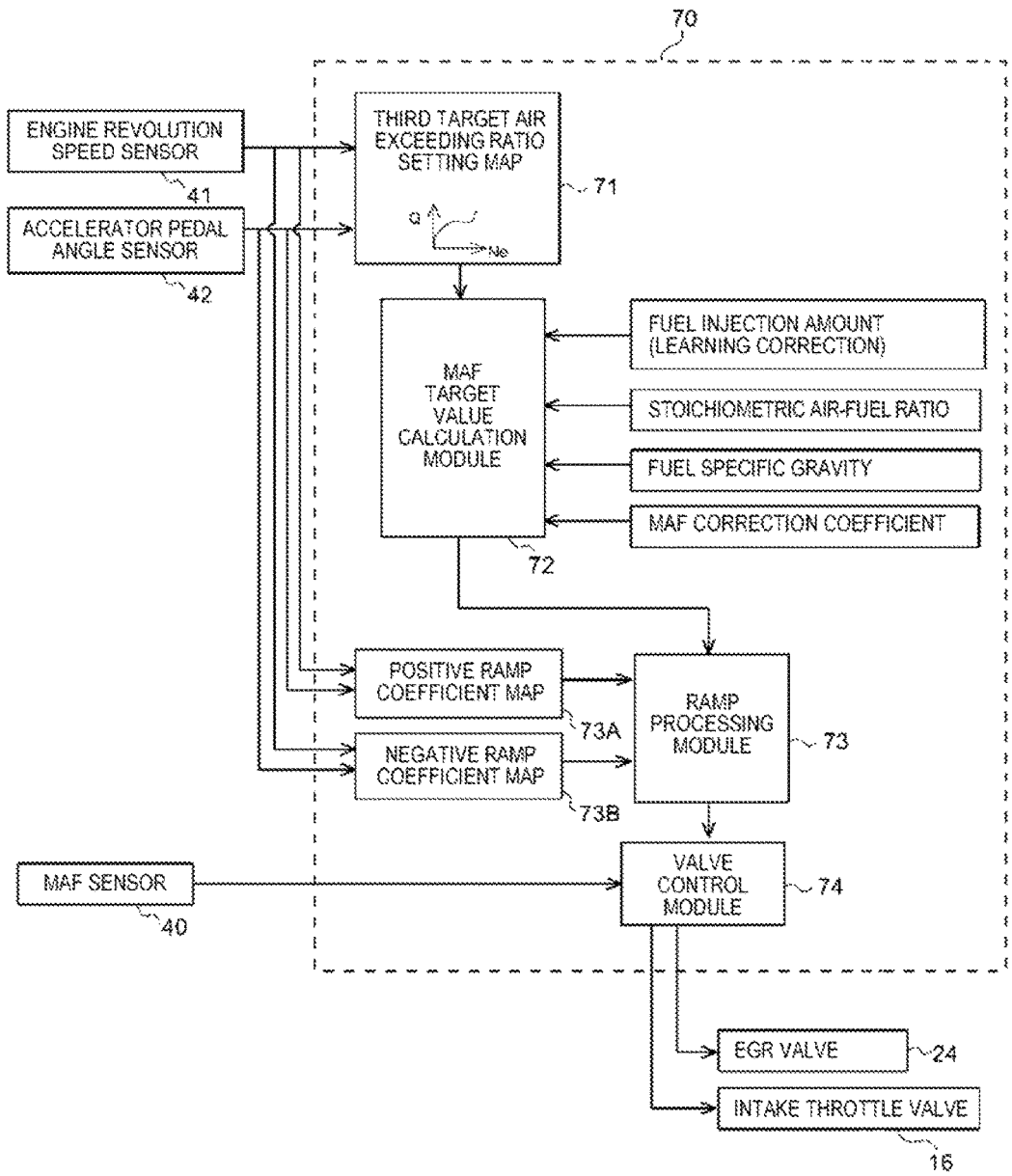
FIG. 7 is a block diagram showing a MAF target value setting process in executing a NOx purging lean control according to the embodiment.

FIG. 7 is a block diagram showing a MAF target value MAFNPL_Trgt setting process in executing a NOx purging lean control. A third target air exceeding ratio setting map 71 is a map that is referred to based on an engine revolution speed Ne and an accelerator pedal angle Q, and air exceeding air ratio target values λNPL_Trgt (third target air exceeding ratios) corresponding to engine revolution speeds Ne and accelerator pedal angles Q in executing a NOx purging lean control are set in advance based on experiments in the map.

Firstly, an air exceeding ratio target value λNPL_Trgt for use in executing the NOx purging lean control is read from the third target air exceeding ratio setting map 71 based on an engine revolution speed Ne and a throttle angle Q which are inputted as input signals and is then inputted into a MAF target value calculation module 72. Further, in the MAF target value calculation module 72, a MAF target value MAFPL_Trgt for use in the NOx purging lean control is calculated based on the following expression (3).

$$\mathrm{MAF}_{NPL\_Trgt} = \lambda_{NPL\_Trgt} \times Q_{fnl\_corrd} \times \mathrm{Ro}_{Fuel} \times \mathrm{AFR}_{sto} / \mathrm{Maf}_{\_corr} \quad (3)$$

In the expression (3), Qfnl_corrd denotes a fuel injection amount (excluding an amount of fuel injected through post injection) on which a learning correction, which will be described later, has been performed, RoFuel denotes a fuel specific gravity, AFRsto denotes a stoichiometric air-fuel ratio, and Maf_corr denotes a MAF correction coefficient, which will be described later.

A MAF target value MAFNPL_Trgt that is calculated by the MAF target value calculation module 72 is inputted into a ramp processing module 73 when the NOx purging flag $F_{SP}$ is on (refer to a time t1 in FIG. 6). The ramp processing module 73 reads a ramp coefficient from a positive ramp coefficient map 73A and a negative ramp coefficient map 73B based on input signals of an engine revolution speed Ne and an acceleration pedal angle Q and inputs a MAF target ramp value MAFNPL_Trgt_Ramp to which the read ramp coefficient is added into a valve control module 74.

The valve control module 74 executes a feedback control in which the intake throttle valve 16 is controlled to be closed while the EGR valve 24 is controlled to be opened so that an actual MAF value MAFAct inputted from the MAF sensor 40 becomes the MAF target ramp value MAFNPL_Trgt_Ramp.

In this way, in this embodiment, the MAF target value MAFNPL_Trgt is set based on the air exceeding ratio target value λNPL_Trgt that is read from the third target air exceeding ratio setting map 71 and the fuel injection amounts of the individual direct injection injectors 11, so that the operation of the air intake system is feedback controlled based on the MAF target value MAFNPL_Trgt. By doing so, the exhaust gas can be reduced effectively to a desired air exceeding ratio that is necessary for the NOx purging lean control without providing a lambda sensor on the upstream side of the NOx storage reduction catalyst 32 or without using a sensor value of the lambda sensor even when the lambda sensor is provided on the upstream side of the NOx storage reduction catalyst 32.

Additionally, the MAF target value MAFNPL_Trgt can be set through a feedforward control by using a fuel injection amount Qfnl_corrd on which a learning correction has been performed as the fuel injection amount of the individual direct injection injectors 11, thereby making it possible to eliminate effectively the influence resulting from the deterioration with age or property variation of the individual direct injection injectors 11.

In addition, the deterioration in drivability that would be caused by a misfire or torque variation of the engine 10 resulting from a dramatic change in the intake air flow can be prevented effectively by adding a ramp coefficient that is set according to the operating condition of the engine 10 to the MAF target value MAFNPL_Trgt.

[Fuel Injection Amount Setting for NOx Purging Rich Control]

Figure 8:
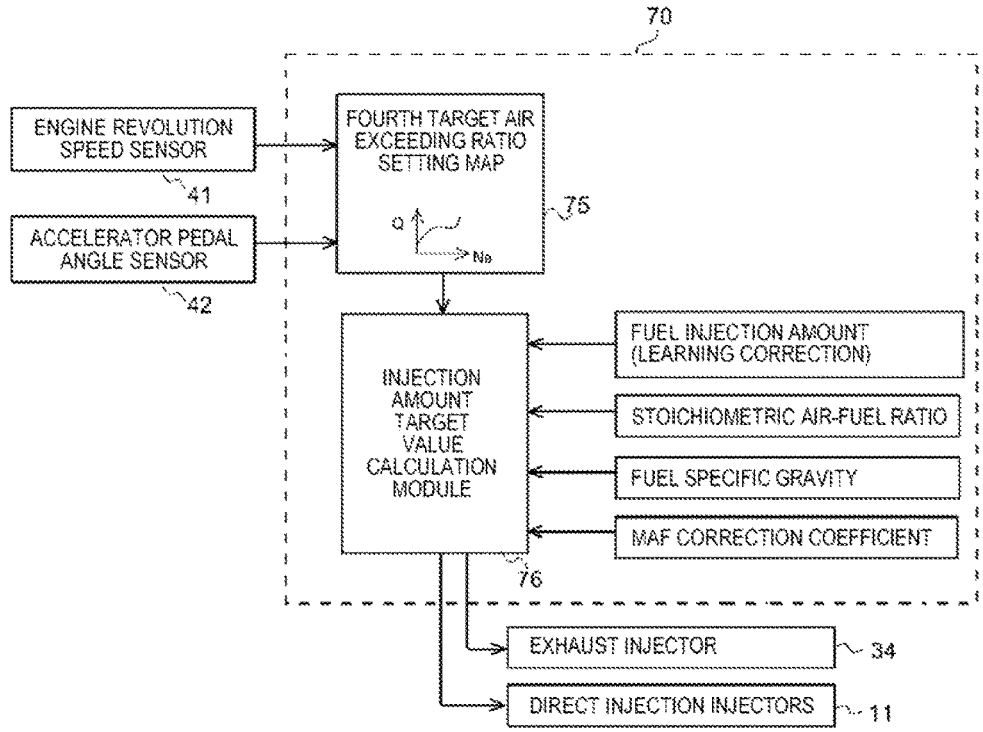
FIG. 8 is a block diagram showing a target injection amount setting process in executing a NOx purging rich control according to the embodiment.

FIG. 8 is a block diagram showing a setting process of a target injection amount QNPR_Trgt (an injection amount per unit time) for an exhaust pipe injection or a post injection in the NOx purging rich control. A fourth target air exceeding ratio setting map 75 is a map that is referred to based on an engine revolution speed Ne and an accelerator pedal angle Q, and air exceeding ratios target values λNPR_Trgt (fourth target air exceeding ratios) corresponding to engine revolution speeds Ne and accelerator pedal angles Q for use in executing the NOx purging rich control are set in advance based on experiments in the map.

Firstly, an air exceeding ratio target value λNPR_Trgt for use in executing the NOx purging rich control is read from the fourth target air exceeding ratio setting map 75 based on an engine revolution speed Ne and an accelerator pedal angle Q which are inputted as input signals and is then inputted into an injection amount target value calculation module 76. Further, in the injection amount target value calculation module 76, a target injection amount QNPR_Trgt for use in the NOx purging rich control is calculated based on the following expression (4).

$$QNPR\_Trgt = MAFNPL\_Trgt \times Maf\_corrd / (\lambda NPR\_Trgt \times RoFuel \times AFRsto) - Qfnl\_corrd \quad (4)$$

In the expression (4), MAFNPL_Trgt denotes a NOx purging lean MAF target value and is inputted from the MAF target value calculation module 72. In addition, Qfnl_corrd denotes a fuel injection amount (excluding an amount of fuel injected through post injection) on which a learning correction, which will be described later, has been performed and to which a MAF tracking control has not yet been applied, RoFuel denotes a fuel specific gravity, AFRsto denotes a stoichiometric air-fuel ratio, and Maf_corr denotes a MAF correction coefficient, which will be described later.

When the NOx purging flag FNP is set on, a target injection amount QNPR_Trgt calculated by the injection amount target value calculation module 76 is transmitted to the exhaust injector 34 or the individual direct injection injectors 11 as an injection instruction signal (refer to the time t1 in FIG. 6). The injection instruction signal is kept transmitted until the NOx purging flag FNP is set off (a time t2 in FIG. 6) by a determination on the end of the NOx purging control, which will be described later.

In this way, in this embodiment, the target injection amount QNPR_Trgt is designed to be set based on the air exceeding ratio target value λNPR_Trgt that is read from the fourth target air exceeding ratio setting map 75 and amounts of fuel injected from the individual direct injection injectors 11. By doing so, the exhaust gas can be reduced effectively to a desired air exceeding ratio that is necessary for the NOx purging rich control without providing a lambda sensor on the upstream side of the NOx storage reduction catalyst 32 or without using a sensor value of the lambda sensor even when the lambda sensor is provided on the upstream side of the NOx storage reduction catalyst 32.

Additionally, the target injection amount QSPR_Trgt can be set through a feedforward control by using the fuel injection amount Qfnl_corrd on which a learning correction has been performed as the fuel injection amounts of the individual direct injection injectors 11, thereby making it possible to eliminate effectively the influence resulting from the deterioration with age or property variation of the individual direct injection injectors 11.

[Determination on End of NOx Purging Control]

The NOx purging control ends by setting off the NOx purging flag FNP when any one of the following conditions is met: (1) injection amounts in the exhaust pipe injection or the post injection are accumulated since a time when the NOx purging flag FNP is set on and the accumulated injection amounts reach an upper threshold amount; (2) an elapsing time that has been counted since the start of the NOx purging control reaches an upper threshold time; and (3) a NOx occlusion amount of the NOx storage reduction catalyst 32 that is calculated based on a model expression that includes as input signals the operating state of the engine 10 and the sensor value of the NOx/lambda sensor 45 is lowered to a predetermined threshold that indicates that NOx is removed successfully (refer to the time t2 in FIG. 6).

In this way, in this embodiment, it is possible to prevent in an ensured fashion the fuel consumption amount from becoming excessive in the event that the NOx purging does not progress as expected due to a reduction in exhaust gas temperature by providing the upper limits to the accumulated injection amount and the elapsing time as the conditions under which the NOx purging control ends.

[Catalyst Temperature Retention Control (MAF Reduction Control)]

Figure 9:
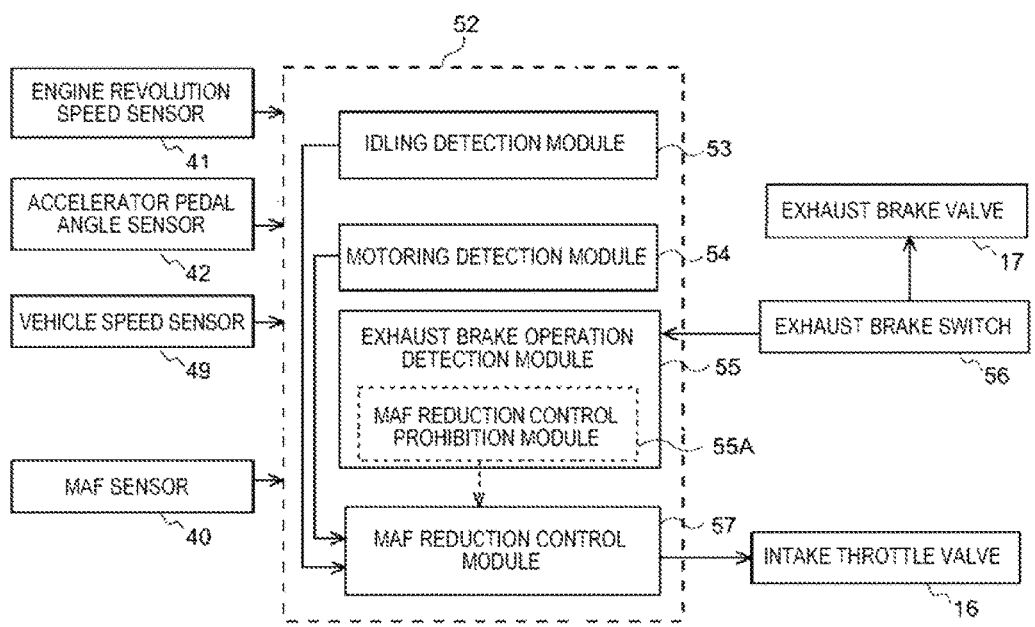
FIG. 9 is a block diagram illustrating a process of executing a catalyst temperature retention control according to the embodiment.

FIG. 9 is a block diagram showing a catalyst temperature retention control process by the catalyst temperature retention control module 52.

An idling detection module 53 detects whether or not the engine 10 is idling based on sensor values inputted from the various sensors 41, 42, 49.

A motoring detection module 54 detects whether or not the engine 10 runs at a predetermined revolution speed or faster so as to be put in a motoring state where the direct injection injectors 11 are stopped from injecting fuel based on sensor values inputted from the various sensors 41, 42, 49.

An exhaust brake operation detection module 55 detects whether or not the exhaust brake system is in operation which closes the exhaust brake valve 17 to thereby raise the pressure of exhaust gas so as to reduce the revolution speed of the engine 10. Whether or not the exhaust brake is in operation may be detected based on whether or not an exhaust brake switch 56 is operated to be on or off which is provided near a driver's seat in a passenger compartment of the vehicle, not shown.

A MAF reduction control module 57 is a catalyst temperature retention controller of the present disclosure and executes, when the following conditions are met, a catalyst temperature retention control (hereinafter, also referred to as a MAF reduction control) in which the angle of the intake throttle valve 16 (or at least one of the intake throttle valve 16 and an exhaust throttle valve) is controlled to be reduced towards a closing position so as to reduce the intake air flow, whereby exhaust gas of a lower temperature is restrained from flowing into both the catalysts 31, 32. (1) a case where a state in which the engine 10 is idling is detected by the idling detection module 53. (2) a case where a state in which the engine 10 is in the motoring state is detected by the motoring detection module 54. The valve angle for the MAF reduction control is feedback controlled based on a deviation between a predetermined target MAF value that is lower than a MAF value for a normal lean operation and a sensor value (an actual MAF value) of the MAF sensor 40. The predetermined target MAF value is designed to be set, for example, by multiplying a base map (not shown) that is referred to based on the operating state of the engine 10 by a correction coefficient according to an intake air temperature and an ambient atmospheric pressure.

A MAF reduction control prohibition module 55A prohibits an execution of the MAF reduction control to secure the barking force in case where the exhaust brake operation detection module 55 detects an operation of the exhaust brake system is detected by even when the motoring detection module 54 detects a motoring state.

In this way, in this embodiment, it is possible to keep the catalysts 31, 32 in active states effectively by executing the catalyst temperature retention control where the intake air flow is reduced in such a situation that the catalysts are cooled down to temperatures that are lower than their activation temperatures as a result of a reduction in the temperature of exhaust gas that occurs when the engine 10 is idling or in the motoring state. In addition, even in a case where the engine 10 is in the motoring state, when the exhaust brake system is activated to operate, the braking force can effectively be secured by prohibiting an execution of the catalyst temperature retention control.

[Catalyst Temperature Estimation]

Figure 10:
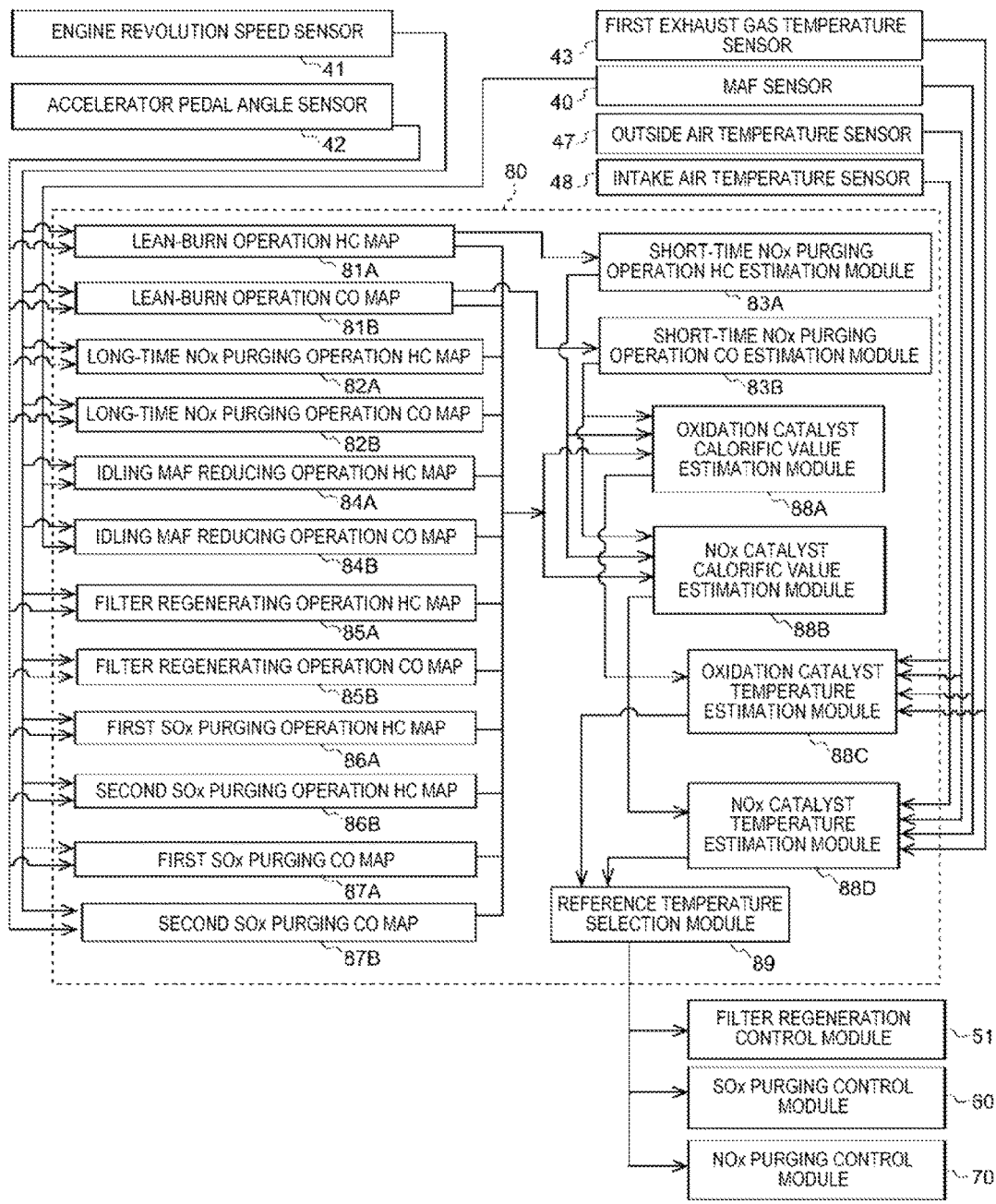
FIG. 10 is a block diagram illustrating a catalyst temperature estimation process according to the embodiment.

FIG. 10 is a block diagram showing a process of estimating an oxidation catalyst temperature and a NOx catalyst temperature by use of the catalyst temperature estimation module 80.

A lean-burn operation HC map 81A is a map that is referred to based on the operating state of the engine 10, and amounts of HC discharged from the engine 10 during lean combustion (hereinafter, referred to as lean-burn operation HC discharge amounts) are set in advance in the map through experiments. In a case where the idling detection module 53 (refer to FIG. 9) detects no idling and all the forced regeneration flag FDPF, the SOx purging flag FSP and the NOx purging flag FNP are off (FDPF=0, FSP=0, FNB=0), a lean-burn operation HC discharge amount that is read from the lean-burn operation HC map 81A based on an engine revolution speed Ne and an accelerator pedal angle Q is designed to be sent to an oxidation catalyst calorific value estimation module 88A and a NOx catalyst calorific value estimation module 88B.

A lean-burn operation CO map 81B is a map that is referred to based on the operating state of the engine 10, and amounts of CO discharged from the engine 10 during lean combustion (hereinafter, referred to as lean-burn operation CO discharge amounts) are set in advance in the map through experiments. In a case where the idling detection module 53 (refer to FIG. 9) detects no idling and all the forced regeneration flag FDPF, the SOx purging flag FSP and the NOx purging flag FNP are off (FDPF=0, FSP=0, FNB=0), a lean-burn operation CO discharge amount that is read from the lean-burn operation CO map 81B based on an engine revolution speed Ne and an accelerator pedal angle Q is designed to be sent to each of the calorific values estimation modules 88A, 88B.

A long-time NOx purging operation HC map 82A is a map that is referred to based on the operating state of the engine 10, and amounts of HC discharged from the engine 10 when a long-time NOx purging is executed in which a target execution time of the NOx purging control becomes a predetermined length of time or longer (hereinafter, referred to as long-time NOx purging operation HC discharge amounts) are set in advance in the map through experiments. When the NOx purging flag FNP is on (FNP=1) and the target execution time of the NOx purging control becomes the predetermined length of time or longer, a long-time NOx purging operation HC discharge amount that is read from the NOx purging operation HC map 82A based on an engine revolution speed Ne and an accelerator pedal opening Q is multiplied by a predetermined correction coefficient according to the operating state of the engine 10, and what results is sent to both the calorific values estimation modules 88A, 88B.

A NOx purging operation CO map 82B is a map that is referred to based on the operating state of the engine 10, and amounts of CO discharged from the engine 10 when a long-time NOx purging is executed in which a target execution time of the NOx purging control becomes a predetermined length of time or longer (hereinafter, referred to as long-time NOx purging operation CO discharge amounts) are set in advance in the map through experiments. When the NOx purging flag FNP is on (FNP=1) and the target execution time of the NOx purging control becomes the predetermined length of time or longer, a long-time NOx purging operation CO discharge amount that is read from the NOx purging operation CO map 82B based on an engine revolution speed Ne and an accelerator pedal opening Q is multiplied by a predetermined correction coefficient according to the operating state of the engine 10, and what results is sent to both the calorific values estimation modules 88A, 88B.

A short-time NOx purging operation HC estimation module 83A estimates and calculates an amount of HC discharged from the engine 10 during a short-time NOx purging control by multiplying an HC discharge amount that is read from the lean-burn operation HC map 81A (or the long-time NOx purging operation HC map 82A) based on an engine revolution speed Ne and an accelerator pedal angle Q by a predetermined correction coefficient in execution of a short-time NOx purging in which the target execution time of the NOx purging control becomes shorter than the predetermined length of time. The short-time NOx purging operation HC discharge amount that is calculated is sent to both the calorific value estimation modules 88A, 88B when the NOx purging flag FNP is on (FNP=1) and the target execution time of the NOx purging control is shorter than the predetermined length of time.

A short-time NOx purging operation CO estimation module 83B estimates and calculates an amount of CO discharged from the engine 10 during a short-time NOx purging control by multiplying a CO discharge amount that is read from the lean-burn operation CO map 81B (or the long-time NOx purging operation CO map 82B) based on an engine revolution speed Ne and an accelerator pedal angle Q by a predetermined correction coefficient in execution of a short-time NOx purging in which the target execution time of the NOx purging control becomes shorter than the predetermined length of time. The short-time NOx purging operation CO discharge amount that is calculated is sent to both the calorific value estimation modules 88A, 88B when the NOx purging flag FNP is on (FNP=1) and the target execution time of the NOx purging control is shorter than the predetermined length of time.

An idling MAF reducing operation HC map 84A (a discharge amount storage of the present disclosure) is a map that is referred to based on the operating state of the engine 10, and amounts of HC discharged from the engine 10 while the catalyst temperature retention control (the MAF reduction control) is being operated (hereinafter, referred to as idling MAF reducing operation HC discharge amounts) are set in advance in the map through experiments. In a case where the catalyst temperature retention control is executed while the engine 10 is idling and all the forced regeneration flag FDPF, the SOx purging flag FSP and the NOx purging flag FNP are off (FDPF=0, FSP=0, FNB=0), an idling MAF reducing operation HC discharge amount that is read from the idling MAF reducing operation HC map 84A based on an engine revolution speed Ne and an accelerator pedal angle Q is designed to be sent to each of the calorific values estimation modules 88A, 88B.

An idling MAF reducing operation HC map 84B (the discharge amount storage of the present disclosure) is a map that is referred to based on the operating state of the engine 10, and amounts of CO discharged from the engine 10 while the catalyst temperature retention control (the MAF reduction control) is being operated (hereinafter, referred to as idling MAF reducing operation CO discharge amounts) are set in advance in the map through experiments. In a case where the catalyst temperature retention control is executed while the engine 10 is idling and all the forced regeneration flag FDPF, the SOx purging flag FSP and the NOx purging flag FNP are off (FDPF=0, FSP=0, FNB=0), an idling MAF reducing operation CO discharge amount that is read from the idling MAF reducing operation CO map 84B based on an engine revolution speed Ne and an accelerator pedal angle Q is designed to be sent to each of the calorific values estimation modules 88A, 88B.

A forced filter regeneration operation HC map 85A is a map that is referred to based on the operating state of the engine 10, and amounts of HC discharged from the engine 10 when a forced filter regeneration is executed (hereinafter, referred to as filter regeneration operation HC discharge amounts) are set in advance in the map through experiments. In a case where the forced regeneration flag FDPF is on (FDPF=1), a filter regeneration operation HC discharge amount read from the forced filter regeneration operation HC map 85A based on an engine revolution speed Ne and an accelerator pedal angle Q is multiplied by a predetermined coefficient corresponding to the operating state of the engine 10, and what is designed to be sent to both the calorific value estimation modules 88A, 88B.

A forced filter regeneration operation CO map 85B is a map that is referred to based on the operating state of the engine 10, and amounts of CO discharged from the engine 10 when a forced filter regeneration control is executed (hereinafter, referred to as filter regeneration operation CO discharge amounts) are set in advance in the map through experiments. In a case where the forced regeneration flag FDPF is on (FDPF=1), a filter regeneration operation CO discharge amount read from the forced filter regeneration operation CO map 85B based on an engine revolution speed Ne and an accelerator pedal angle Q is multiplied by a predetermined coefficient corresponding to the operating state of the engine 10, and what results is designed to be sent to both the calorific value estimation modules 88A, 88B.

A first SOx purging operation HC map 86A is a map that is referred to based on the operating state of the engine 10, and amounts of HC discharged from the engine 10 when the SOx purging control is executed in such a state that an injection pattern of the direct injection injectors 11 includes an after injection (hereinafter, referred to as first SOx purging operation HC discharge amounts) are set in advance in the map through experiments. In a case where the SOx purging flag FSP is on (FSP=1) and the injection pattern of the direct injection injectors 11 includes the after injection, a first SOx purging operation HC discharge amount that is read from the first SOx purging operation HC map 86A based on an engine revolution speed Ne and an accelerator pedal angle Q is multiplied by a predetermined coefficient, and what results is designed to be sent to both the calorific value estimation modules 88A, 88B.

A second SOx purging operation HC map 86B is a map that is referred to based on the operating state of the engine 10, and amounts of HC discharged from the engine 10 when the SOx purging control is executed in such a state that an injection pattern of the direct injection injectors 11 includes no after injection (hereinafter, referred to as second SOx purging operation HC discharge amounts) are set in advance in the map through experiments. In a case where the SOx purging flag FSP is on (FSP=1) and the injection pattern of the direct injection injectors 11 includes no after injection, a second SOx purging operation HC discharge amount that is read from the second SOx purging operation HC map 86B based on an engine revolution speed Ne and an accelerator pedal angle Q is multiplied by a predetermined coefficient, and what results is designed to be sent to both the calorific value estimation modules 88A, 88B.

A first SOx purging operation CO map 87A is a map that is referred to based on the operating state of the engine 10, and amounts of CO discharged from the engine 10 when the SOx purging control is executed in such a state that an injection pattern of the direct injection injectors 11 includes an after injection (hereinafter, referred to as first SOx purging operation CO discharge amounts) are set in advance in the map through experiments. In a case where the SOx purging flag FSP is on (FSP=1) and the injection pattern of the direct injection injectors 11 includes the after injection, a first SOx purging operation CO discharge amount that is read from the first SOx purging operation CO map 87A based on an engine revolution speed Ne and an accelerator pedal angle Q is multiplied by a predetermined coefficient, and what results is designed to be sent to both the calorific value estimation modules 88A, 88B.

A second SOx purging operation CO map 87B is a map that is referred to based on the operating state of the engine 10, and amounts of CO discharged from the engine 10 when the SOx purging control is executed in such a state that an injection pattern of the direct injection injectors 11 includes no after injection (hereinafter, referred to as second SOx purging operation CO discharge amounts) are set in advance in the map through experiments. In a case where the SOx purging flag FSP is on (FSP=1) and the injection pattern of the direct injection injectors 11 does not include the after injection, a second SOx purging operation CO discharge amount that is read from the second SOx purging operation CO map 87B based on an engine revolution speed Ne and an accelerator pedal angle Q is multiplied by a predetermined coefficient, and what results is designed to be sent to both the calorific value estimation modules 88A, 88B.

The SOx purging operation HC and CO maps 86A to 87B are not limited to the two types of maps for each of the HC and CO maps which correspond to the existence and non-existence of the after injection and hence may each include a plurality of maps which correspond to the existence and non-existence of a pilot injection or a pre-injection and respective injection timings of those injections.

The oxidation catalyst calorific value estimation module 88A is a calorific value estimation unit of the present disclosure and estimates calorific values of HC and CO inside the oxidation catalyst 31 (hereinafter, referred to as oxidation catalyst HC and CO calorific values) based on HC and CO discharge amounts that are inputted from the maps 81A to 87B and the estimation modules 83A, 83B according to the NOx purging flag FNP, the SOx purging flag FSP, the forced regeneration flag FDPF, the existence of a MAF reduction when the engine 10 is idling and the length of the execution time of the NOx purging. Oxidation catalyst HC and CO calorific values should be estimated and calculated based on a model expression or a map that includes HC and CO discharge amounts sent from the individual maps 81A to 86B or the estimation modules 87A, 87B as input values.

The NOx catalyst calorific value estimation module 88B is the calorific value estimation unit of the present disclosure and estimates calorific values of HC and CO inside the NOx storage reduction catalyst 32 (hereinafter, referred to as NOx catalyst HC and CO calorific values) based on HC and CO discharge amounts that are inputted from the maps 81A to 87B and the estimation modules 83A, 83B according to the NOx purging flag FNP, the SOx purging flag FSP, the forced regeneration flag FDPF, the existence of a MAF reduction when the engine 10 is idling and the length of the execution time of the NOx purging. NOx catalyst HC and CO calorific values should be estimated and calculated based on a model expression or a map that includes HC and CO discharge amounts sent from the individual maps 82A to 86B or the estimation modules 87A, 87B as input values.

An oxidation catalyst temperature estimation module 88C is a catalyst temperature estimation unit of the present disclosure and estimates and calculates a catalyst temperature of the oxidation catalyst 31 (hereinafter, referred to as an oxidation catalyst temperature) based on a model expression or a map that includes as input values an oxidation catalyst inlet temperature that is detected by the first exhaust gas temperature sensor 43, oxidation catalyst HC and CO calorific values inputted from the oxidation catalyst calorific value estimation module 88A, a sensor value of the MAF sensor 40, and an amount of heat dissipated to outside air that is estimated from a sensor value of the outside air temperature sensor 47 or the intake air temperature sensor 48.

Exothermic reactions of HC and CO in an interior of the oxidation catalyst 31 are lost or reduced to a negligible level when the engine 10 is in the motoring state where fuel injection is stopped. Due to this, an oxidation catalyst temperature is designed to be estimated and calculated based on an oxidation catalyst inlet temperature, a MAF sensor value and an amount of dissipation of heat to the outside air without using oxidation catalyst HC and CO calorific values inputted from the oxidation catalyst calorific value estimation module 88A in the motoring state.

A NOx catalyst temperature estimation module 88D is the catalyst temperature estimation unit of the present disclosure and estimates and calculates a catalyst temperature of the NOx storage and reduction catalyst 32 (hereinafter, referred to as a NOx catalyst temperature) based on a model expression or a map that includes as input values an oxidation catalyst temperature inputted from the oxidation catalyst temperature estimation module 88A (hereinafter, also referred to as a NOx catalyst inlet temperature), NOx catalyst HC and CO calorific values inputted from the NOx catalyst calorific value estimation module 88B, and an amount of heat dissipated to outside air that is estimated from a sensor value of the outside air temperature sensor 47 or the intake air temperature sensor 48.

Exothermic reactions of HC and CO in an interior of the NOx storage reduction catalyst 32 are lost or reduced to a negligible level when the engine 10 is in the motoring state where fuel injection is stopped. Due to this, a NOx catalyst temperature is designed to be estimated and calculated based on a NOx catalyst inlet temperature, a MAF sensor value and an amount of dissipation of heat to the outside air without using NOx catalyst HC and CO calorific values inputted from the NOx catalyst calorific value estimation module 88B in the motoring state.

In this way, in this embodiment, the HC and CO maps 81A to 87B are switched as required according to the operating states of the engine 10 such as the normal lean-burn operating state where HC and CO discharge amounts differ from each other, the idling state where the catalyst temperature retention control (the MAF reduction) is executed, the forced filter regeneration state, the SOx purging operating state, and the NOx purging operating state. Thus, by doing this, HC and CO calorific values in the interiors of the catalysts can be calculated accurately according to those operating states of the engine 10, thereby making it possible to enhance effectively the accuracy with which the temperatures of the catalysts 31, 32 are estimated.

When the SOx purging is operated, the maps 86A to 87B are switched as required according to the multiple injection patterns of the direct injection injectors 11 as when the after injection is executed where the HC and CO calorific values inside the catalysts 31, 32 are increased. Thus, by doing this, HC and CO calorific values can be calculated accurately according to the multiple injection patterns, thereby making it possible to enhance effectively the accuracy with which the catalyst temperatures are estimated when the SOx purging is operated.

When the NOx purging is operated, the maps are used according to the length of the execution time. For example, when the long-time NOx purging operation is executed, the maps 82A, 82B are used. On the other hand, when the short-time NOx purging operation is executed where the mapping is difficult, a method is used together in which the values of the lean-burn operation maps 81A, 81B are multiplied by a coefficient. Thus, HC and CO calorific values can be calculated accurately according to the length of the NOx purging execution time, thereby making it possible to enhance effectively the accuracy with which the temperatures of the catalysts are estimated when the NOx purging is operated.

In the motoring state, the catalyst temperatures are calculated based on the catalyst inlet temperature, the MAF value and the amount of dissipation of heat to the outside without considering the HC and CO calorific values. Thus, it is also possible to estimate effectively the temperatures of the catalysts 31, 32 in the motoring state.

[FB Control Reference Temperature Selection]

A reference temperature selection module 89 shown in FIG. 10 selects a reference temperature for use for temperature feedback controls for the forced filter regeneration and the SOx purging that have been described heretofore.

In the exhaust purification system including the oxidation catalyst 31 and the NOx storage reduction catalyst 32, the calorific values of HC and CO in the catalysts 31, 32 differ according to the exothermic properties of the catalysts 31, 32. Because of this, it is preferable to select the catalyst temperature of the catalyst having the greater calorific values of HC and CO as a reference temperature for use for the temperature feedback control to improve the controllability.

The reference temperature selection module 89 selects one of the oxidation catalyst temperature and the NOx catalyst temperature that exhibits a greater calorific value that is estimated from an operating state of the engine 10 then and sends the selected catalyst temperature to the filter regeneration control module 51 and the SOx purging control module 60 as a reference temperature for the temperature feedback control. To describe this more specifically, when the forced filter regeneration is operated where the oxidation concentration in exhaust gas is relatively high and the HC and CO calorific values in the oxidation catalyst 31 are increased, the oxidation catalyst temperature inputted from the oxidation catalyst temperature estimation module 88A is selected as a reference temperature for the temperature feedback control. On the other hand, when the SOx purging rich control or the NOx purging rich control is operated where the HC and CO calorific values in the NOx storage reduction catalyst 32 are increased due to a reduction in oxidation concentration in exhaust gas, the NOx catalyst temperature inputted from the NOx catalyst temperature estimation module 88B is selected as a reference temperature for the temperature feedback control.

In this way, in this embodiment, the catalyst temperature exhibiting the greater calorific values of HC and CO is selected as the reference temperature for the temperature feedback control, thereby making it possible to enhance the controllability

[MAF Tracking Control]

The MAF tracking control module 98 executes a control to correct a fuel injection timing and a fuel injection amount of the individual direct injection injectors 11 according to a change in MAF during the following switching periods: (1) a switching period when the lean state resulting in the normal operation is switched to the rich state resulting from executing the SOx purging control or the NOx purging control; and (2) the rich state resulting from executing the SOx purging control or the NOx purging control is switched to the lean state resulting in the normal operation (referred to as a MAF tracking control).

[Injection Amount Learning Correction]

Figure 11:
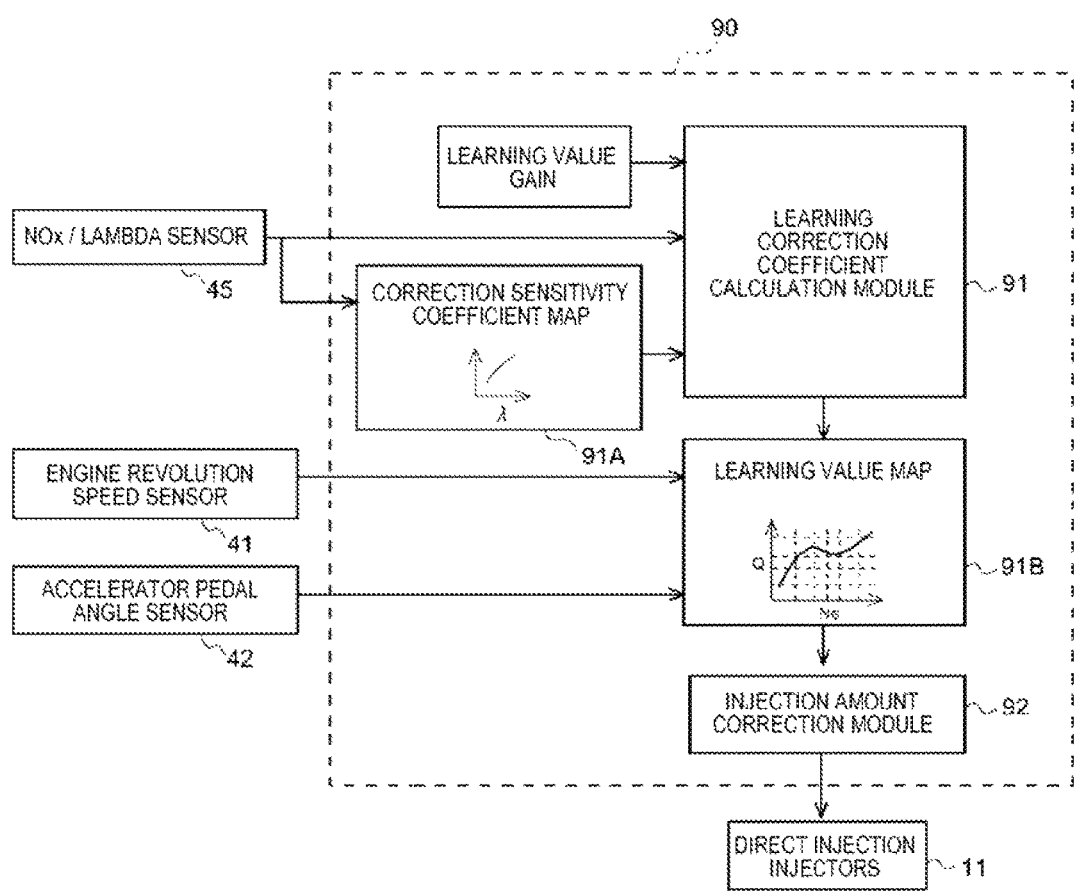
FIG. 11 is a block diagram showing an injector's injection amount learning correction process according to the embodiment.

As shown in FIG. 11, the injection amount learning correction unit 90 has a learning correction coefficient calculating module 91 and an injection amount correction module 92.

Figure 12:
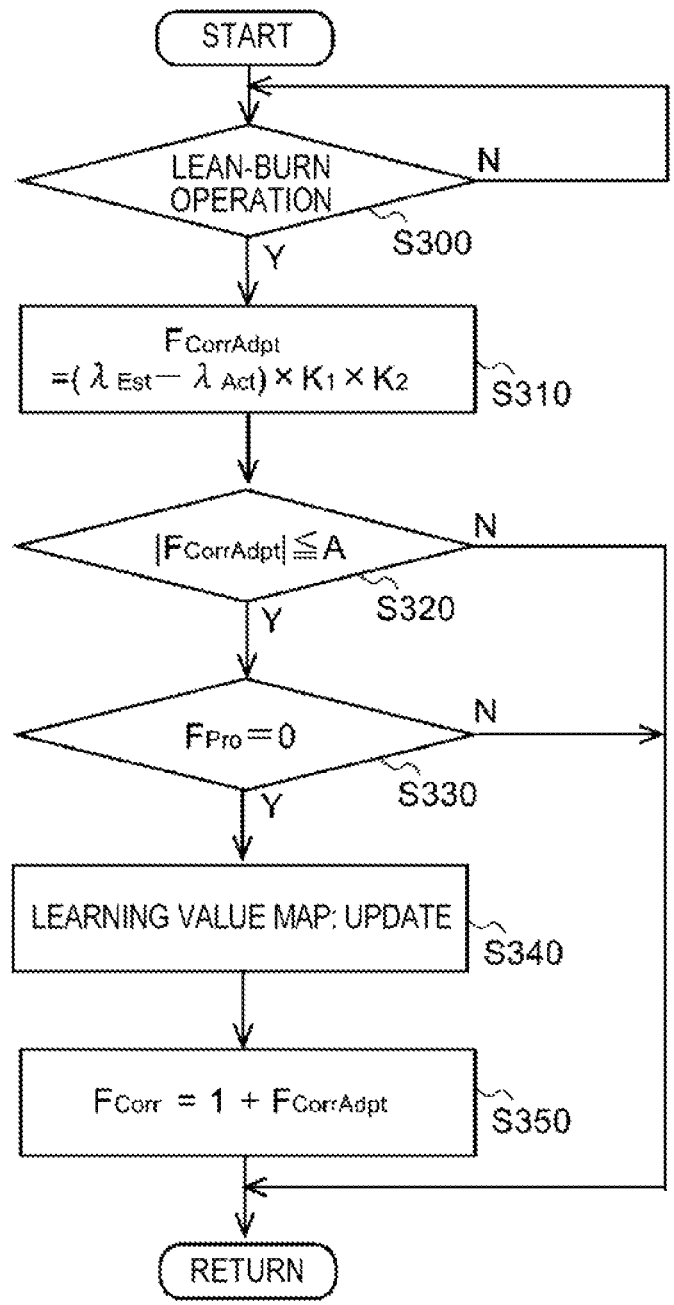
FIG. 12 is a flow chart illustrating a learning correction coefficient calculation process according to the embodiment.

The learning correction coefficient calculating module 91 calculates a learning correction coefficient FCorr for a fuel injection amount based on an error $\Delta\lambda$ between an actual lambda value $\lambda Act$ that is detected by the NOx/lambda sensor 45 when the engine 10 operates in a lean-burn state and an estimated lambda value $\lambda Est$. Since the concentration of HC in exhaust gas is low when the exhaust gas is lean, a change in exhaust gas lambda value due to an oxidation reaction of HC in the oxidation catalyst 31 is so little as to be ignored. Due to this, it is considered that the actual lambda value $\lambda Act$ in exhaust gas that passes through the oxidation catalyst 31 to be detected by the NOx/lambda sensor 45 on the downstream side coincides with the estimated lambda value $\lambda Est$ in exhaust gas discharged from the engine 10. Due to this, in the event that an error $\Delta\lambda$ is caused between the actual lambda value $\lambda Act$ and the estimated lambda value $\lambda Est$, it can be assumed that the error $\Delta\lambda$ is caused by a difference between an instructed injection amount given to the individual direct injection injectors 11 and an actual injection amount therefrom. Hereinafter, a calculation process of a learning correction coefficient that is executed using the error $\Delta\lambda$ by the learning correction coefficient calculation module 91 will be described based on a flow of the calculation process shown in FIG. 12.

In step S300, it is determined based on an engine revolution speed Ne and an accelerator pedal angle Q whether or not the engine 10 is operating in the lean state. If it is determined that the engine 10 is operating in the lean state, the flow proceeds to step S310 to start a calculation of a learning correction coefficient.

In step S310, an error $\Delta\lambda$ that is obtained by subtracting an actual lambda value $\lambda Act$ detected by the NOx/lambda sensor 45 from an estimated lambda value $\lambda Est$ is multiplied by a learning value gain K1 and a correction sensitivity coefficient K2 to thereby calculate a learning value FCorrAdpt (FCorrAdpt=($\lambda Est$−$\lambda Act$)×k1×k2). The estimated lambda value $\lambda Est$ is estimated and calculated from the operating state of the engine 10 that corresponds to the engine revolution speed Ne and the accelerator pedal angle Q. The correction sensitivity coefficient K2 is read from a correction sensitivity coefficient map 91 shown in FIG. 11 using the actual lambda value $\lambda Act$ detected by the NOx/lambda sensor 45 as an input signal.

In step S320, it is determined whether or not an absolute value |FCorrAdpt| of the learning value FCorrAdpt is within a range of a predetermined correction limit value A. If it is determined that the absolute value |FCorrAdpt| exceeds the correction limit value A, this control is caused to proceed directly to return to end the current learning.

In step S330, it is determined whether or not a learning prohibition flag FPro is off. As an example of a case where the learning prohibition flag $F_{Pro}$ is set on, a transient operation of the engine 10, a SOx purging control operation (FSP=1) and a NOx purging control operation (FNP=1) can be raised. The reason that the determination above is made is that in such a state that those conditions are met, the error $\Delta\lambda$ becomes great due to the change in actual lambda value $\lambda Act$ to thereby make it impossible to execute an accurate learning. Whether or not the engine 10 is in a transient operating state should be determined based on, for example, a variation with time of the actual lambda value $\lambda Act$ that is detected by the NOx/lambda sensor 45, and in a case where the variation with time of the actual lambda value $\lambda Act$ is greater than a predetermined threshold, it is determined that the engine 10 is in the transient operating state.

In step S340, a learning value map 91B (refer to FIG. 11) that is referred to based on the engine revolution speed Ne and the acceleration pedal angle Q is updated to the learning value FCorrAdpt that is calculated in step S310. To be more specific, a plurality of learning areas, which are defined according to engine revolution speeds Ne and accelerator pedal angles Q, are set on the learning value map 91B. These learning areas are preferably set so that those tending to be used more frequently are set narrower whereas others tending to be used less frequently are set wider. By setting the learning areas in that way, the learning accuracy is improved in the areas tending to be used more frequently, and the occurrence of no learning can be prevented effectively in the areas tending to be used less frequently.

In step S350, a learning correction coefficient FCorr is calculated by adding "one" to a learning value that is read from the learning value map 91B using the engine revolution speed Ne and the accelerator pedal angle Q as input signals (FCorr=1+FCorrAdpt). This learning correction coefficient FCorr is inputted into the injection amount correction module 92 shown in FIG. 11.

The injection amount correction module 92 executes corrections of fuel injection amounts for a pilot injection QPilot, a pre-injection QPre, a main injection QMain, an after-injection QAfter, and a post injection QPost by multiplying basic injection amounts for those injections by the learning correction coefficient FCorr.

In this way, it is possible to eliminate effectively variations resulting from the deterioration with age or property variation of the direct injection injectors 11 or the individual difference thereof by correcting the fuel injection amounts of the direct injection injectors 11 with the leaning value corresponding to the error $\Delta\lambda$ between the estimated lambda value $\lambda$Est and the actual lambda value $\lambda$Act.

[MAF Correction Coefficient]

The MAF correction coefficient calculation module 95 calculates a MAF correction coefficient Maf_corr that is used for setting a MAF target value MAFSPL_Trgt or a target injection amount QSPR_Trgt for a SOx purging control operation.

In this embodiment, the fuel injection amounts of the individual direct injection injectors 11 are corrected based on the error $\Delta\lambda$ between the actual lambda value $\lambda$Act detected by the NOx/lambda sensor 45 and the estimated lambda value $\lambda$Est. However, since lambda is a ratio of air to fuel, the cause for the error $\Delta\lambda$ is not always the influence resulting from the difference between the instructed injection amount given to the individual direct injection injectors 11 and the actual injection amount therefrom. Namely, it is possible that not only errors of the direct injection injectors 11 but also an error of the MAF sensor 40 influences the lambda value error $\Delta\lambda$.

Figure 13:
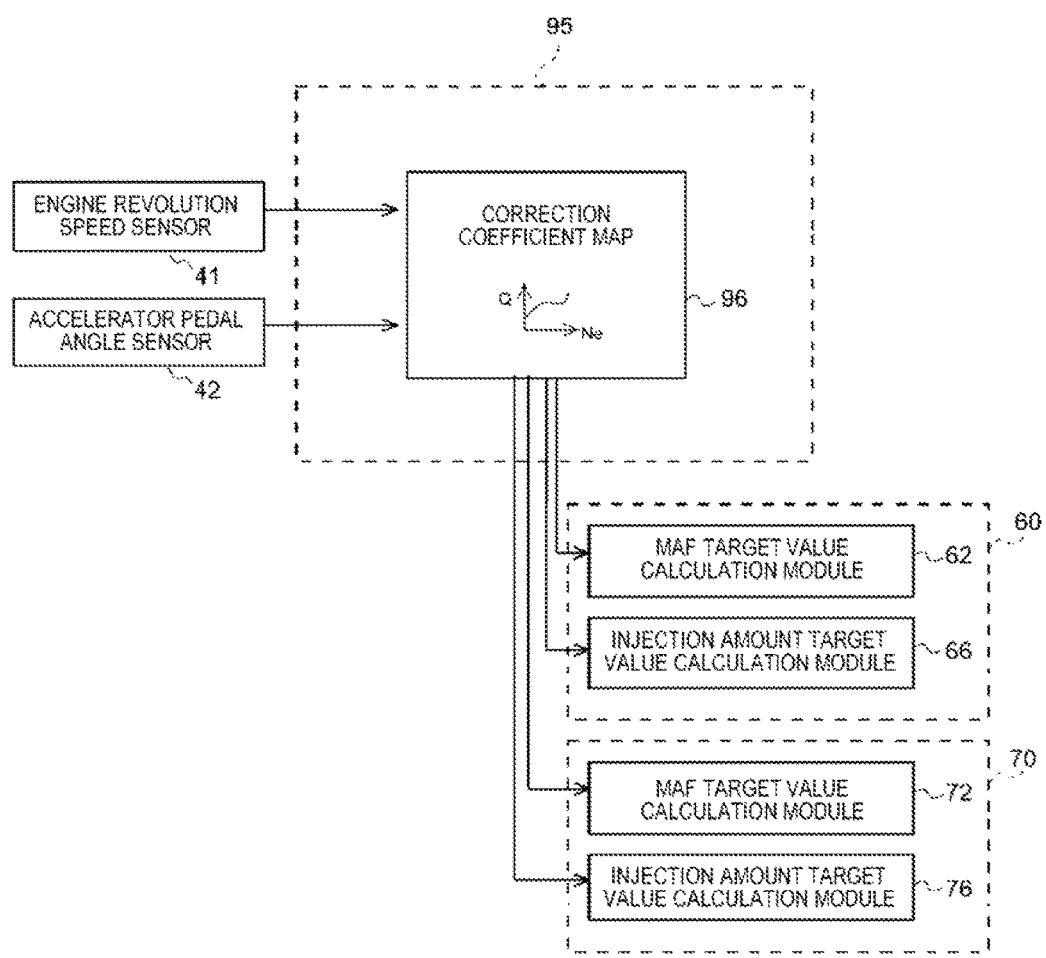
FIG. 13 is a block diagram showing a MAF correction coefficient setting process according to the embodiment.

FIG. 13 is a block diagram showing a setting process of a MAF correction coefficient Maf_corr by the MAF correction coefficient calculation module 95. A correction coefficient setting map 96 is a map that is referred to based on the engine revolution value Ne and the accelerator pedal angle Q, and MAF correction coefficients Maf_corr indicating sensor properties of the MAF sensor 40 corresponding to engine revolution speeds Ne and accelerator pedal angles Q are set in advance through experiments in the map.

The MAF correction coefficient calculation module 95 reads a MAF correction coefficient Maf_corr from the correction coefficient setting map 96 using an engine revolution speed Ne and an accelerator pedal angle Q which are inputted as input signals and sends this MAF correction coefficient Maf_corr to both the MAF target value calculation module 62 and the injection amount target value calculation module 66. By doing so, it is possible to reflect effectively the sensor properties of the MAF sensor 40 to the setting of a MAF target value MAFSPL_Trgt and a target injection amount QSPR_Trgt in operating the SOx purging control.

Other Examples

The invention is not limited to the embodiment that has been described heretofore and hence can be carried out by being modified as required without departing from the spirit and scope of the invention.

This patent application is based on Japanese Patent Application (No. 2015-032281) filed on Feb. 20, 2015, the contents of which are incorporated herein by reference.

INDUSTRIAL APPLICABILITY

The exhaust purification system and the control method therefor of the invention have the advantage that the execution of the catalyst temperature retention control can be controlled according to whether or not the exhaust brake system is in operation when the internal combustion engine is operating in the motoring state and are useful in realizing the system which can secure the exhaust braking force effectively.

DESCRIPTION OF REFERENCE NUMERALS

10 Engine
11 Direct injection injector
12 Intake passage
13 Exhaust passage
16 Intake throttle valve
24 EGR valve
31 Oxidation catalyst
32 NOx storage reduction catalyst
33 Filter
34 Exhaust injector
40 MAF sensor
45 NOx/lambda sensor
50 ECU

The invention claimed is:

1. An exhaust purification system comprising:
an exhaust after-treatment apparatus which is provided on an exhaust passage of an internal combustion engine and which includes a catalyst for purifying exhaust gas discharged from the internal combustion engine; and
a controller configured to:
execute a catalyst temperature retention control for reducing an intake air flow to suppress a reduction in temperature of the catalyst when the internal combustion engine is in a motoring state, where fuel injection into the internal combustion engine is stopped, and the catalyst temperature retention control continues to reduce the intake air flow also during an idling state, where the fuel injection is not stopped;
prohibit the execution of the catalyst temperature retention control in a case where an activation of an exhaust brake system which is connected to the internal combustion engine is detected while the internal combustion engine is in the motoring state; and
estimate a temperature of the catalyst based on at least one of a hydrocarbon calorific value and a carbon monoxide calorific value, which is estimated by the controller, when the catalyst temperature retention control is executed while the internal combustion engine is in the idling state,
wherein the temperature of the catalyst is estimated based on a catalyst inlet temperature, an intake air flow, and a heat dissipation amount to an outside of the catalyst without using the at least one of the hydrocarbon calorific value and the carbon monoxide calorific value estimated by the controller when the internal combustion engine is in the motoring state.

2. The exhaust purification system according to claim 1, comprising:
a storage configured to acquire and store in advance at least one of a hydrocarbon amount and a carbon monoxide amount which is discharged from the internal combustion engine when the catalyst temperature retention control is executed while the internal combustion engine is in the idling state,
wherein the at least one of the hydrocarbon calorific value and the carbon monoxide calorific value is estimated based on at least one of the hydrocarbon amount and the carbon monoxide amount which are read from the storage when the catalyst temperature retention control is executed while the internal combustion engine is in the idling state.

3. An exhaust purification system comprising:
an exhaust after-treatment apparatus which is provided on an exhaust passage of an internal combustion engine and which includes a catalyst for purifying exhaust gas discharged from the internal combustion engine; and
a controller for detecting an operating state of the internal combustion engine and controlling an air-fuel ratio of the exhaust gas discharged from the internal combustion engine, wherein
the controller operates to execute:
a catalyst temperature retention process of executing a catalyst temperature retention control in which an intake air flow of the internal combustion engine is reduced to suppress a reduction in temperature of the catalyst when the internal combustion engine is in a motoring state where fuel injection is stopped, and the catalyst temperature retention control continues to reduce the intake air flow also during an idling state, where the fuel injection is not stopped;
a prohibition process of prohibiting an execution of the catalyst temperature retention process in a case where an activation of an exhaust brake which is connected to the internal combustion engine is detected while the internal combustion engine is in the motoring state; and
an estimation process of estimating a temperature of the catalyst based on at least one of a hydrocarbon calorific value and a carbon monoxide calorific value, which is estimated by the controller, when the catalyst temperature retention control is executed while the internal combustion engine is in the idling state,
wherein the temperature of the catalyst is estimated based on a catalyst inlet temperature, an intake air flow, and a heat dissipation amount to an outside of the catalyst without using the at least one of the hydrocarbon calorific value and the carbon monoxide calorific value estimated by the controller when the internal combustion engine is in the motoring state.

4. A control method for an exhaust purification system which comprises: an exhaust after-treatment apparatus which is provided on an exhaust passage of an internal combustion engine and which includes a catalyst for purifying exhaust gas discharged from the internal combustion engine; and a controller for detecting an operating state of the internal combustion engine and controlling an air-fuel ratio of the exhaust gas discharged from the internal combustion engine, the control method comprising:
a catalyst temperature retention process of executing a catalyst temperature retention control in which an intake air flow of the internal combustion engine is reduced to suppress a reduction in temperature of the catalyst when the internal combustion engine is in a motoring state where fuel injection is stopped, and the catalyst temperature retention control continues to reduce the intake air flow also during an idling state, where the fuel injection is not stopped;
a prohibition process of prohibiting an execution of the catalyst temperature retention process in a case where an activation of an exhaust brake which is connected to the internal combustion engine is detected while the internal combustion engine is in the motoring state; and
an estimation process of estimating a temperature of the catalyst based on at least one of a hydrocarbon calorific value and a carbon monoxide calorific value, which is estimated by the controller, when the catalyst temperature retention control is executed while the internal combustion engine is in the idling state,
wherein the temperature of the catalyst is estimated based on a catalyst inlet temperature, an intake air flow, and a heat dissipation amount to an outside of the catalyst without using the at least one of the hydrocarbon calorific value and the carbon monoxide calorific value estimated by the controller when the internal combustion engine is in the motoring state.

* * * * *